US011360662B2

(12) United States Patent
Helke

(10) Patent No.: US 11,360,662 B2
(45) Date of Patent: Jun. 14, 2022

(54) ACCOMMODATIVE USER INTERFACE FOR HANDHELD ELECTRONIC DEVICES

(71) Applicant: Michael Helke, Geneva (CH)

(72) Inventor: Michael Helke, Geneva (CH)

( * ) Notice: Subject to any disclaimer, the term of this patent is extended or adjusted under 35 U.S.C. 154(b) by 0 days.

(21) Appl. No.: 16/311,804

(22) PCT Filed: Jun. 20, 2017

(86) PCT No.: PCT/IB2017/053649
§ 371 (c)(1),
(2) Date: Dec. 20, 2018

(87) PCT Pub. No.: WO2017/221141
PCT Pub. Date: Dec. 28, 2017

(65) Prior Publication Data

US 2020/0133474 A1 Apr. 30, 2020

Related U.S. Application Data

(60) Provisional application No. 62/352,070, filed on Jun. 20, 2016.

(51) Int. Cl.
*G06F 3/04883* (2022.01)
*G06F 3/0354* (2013.01)
(Continued)

(52) U.S. Cl.
CPC ........ *G06F 3/04883* (2013.01); *G06F 1/1626* (2013.01); *G06F 1/1684* (2013.01);
(Continued)

(58) Field of Classification Search
CPC .... G06F 3/04883; G06F 3/016; G06F 3/0236; G06F 3/03547; G06F 3/038; G06F 3/044;
(Continued)

(56) References Cited

U.S. PATENT DOCUMENTS

| | | | |
|---|---|---|---|
| 7,800,592 | B2 | 9/2010 | Kerr et al. |
| 8,988,359 | B2 | 3/2015 | Nurmi |

(Continued)

FOREIGN PATENT DOCUMENTS

| | | |
|---|---|---|
| EP | 3472689 | 4/2019 |
| JP | 2008-532185 A | 8/2008 |
| WO | WO-2017221141 A1 | 12/2017 |

OTHER PUBLICATIONS

ISR_for_International_Applicaton_No. PCT/IB2017/053649.

(Continued)

*Primary Examiner* — Nicholas Ulrich
(74) *Attorney, Agent, or Firm* — Schwegman Lundberg & Woessner, P.A.

(57) ABSTRACT

A tactile user interface for handheld electronic devices that accommodates the human hand irrespective of morphology, size or laterality thus enabling any user to conveniently operate such devices with all five fingers which comprises an outer surface, one or more continuous sensor regions on said outer surface, wherein the regions are configured with one or more sensors to detect multiple simultaneous contact patches made by one or more fingers and/or the base of the thumb of a hand, a processor connected to the one or more sensors, wherein the processor identifies a particular contact patch based on the relative location of the particular contact patch with respect to the other contact patches wherein the processor is configured to control an electronic device by identifying a sign consisting of the combined distinctive features of one or more contact patches and associating the sign with a signal for controlling the electronic device or to input data and by transmitting said signal to the device.

14 Claims, 19 Drawing Sheets

(51) Int. Cl.
*G06F 1/16* (2006.01)
*G06F 3/01* (2006.01)
*G06F 3/023* (2006.01)
*G06F 3/044* (2006.01)

(52) U.S. Cl.
CPC ............ *G06F 3/016* (2013.01); *G06F 3/0236* (2013.01); *G06F 3/03547* (2013.01); *G06F 3/044* (2013.01); *G06F 2203/0339* (2013.01); *G06F 2203/04808* (2013.01)

(58) Field of Classification Search
CPC ................ G06F 1/1626; G06F 1/1684; G06F 2203/0339; G06F 2203/04808
See application file for complete search history.

(56) References Cited

U.S. PATENT DOCUMENTS

| | | | | |
|---|---|---|---|---|
| 9,310,905 | B2* | 4/2016 | Luo | G06F 3/041 |
| 2006/0197750 | A1* | 9/2006 | Kerr | G06F 1/1626 345/173 |
| 2009/0166098 | A1* | 7/2009 | Sunder | G06F 1/1626 178/18.04 |
| 2010/0007618 | A1 | 1/2010 | Park et al. | |
| 2010/0085317 | A1* | 4/2010 | Park | G06F 3/04817 345/173 |
| 2010/0134423 | A1* | 6/2010 | Brisebois | G06F 3/03547 345/173 |
| 2011/0167391 | A1 | 7/2011 | Momeyer et al. | |
| 2012/0052929 | A1* | 3/2012 | Thammasouk | G06F 1/1626 455/575.1 |
| 2013/0278552 | A1* | 10/2013 | Kamin-Lyndgaard | G06F 3/0416 345/174 |
| 2014/0362025 | A1* | 12/2014 | Sesto | G08C 17/02 345/174 |
| 2014/0375582 | A1 | 12/2014 | Park et al. | |
| 2016/0048668 | A1 | 2/2016 | Zafiris | |
| 2016/0077627 | A1* | 3/2016 | Vecera | G06F 3/044 345/174 |
| 2016/0378251 | A1* | 12/2016 | Aznoe | G06F 3/04812 345/158 |
| 2018/0067545 | A1* | 3/2018 | Provancher | A63F 13/218 |
| 2018/0329455 | A1* | 11/2018 | Vesikivi | A63H 33/26 |

OTHER PUBLICATIONS

Written_Opinion_for_International_Application_No. PCT/IB2017/053649.
"Japanese Patent Application No. 2018-567629, Decision to Grant a Patent dated Jun. 30, 2020", (w/ English Translation), 5 pgs.
"Japanese Patent Application No. 2018-567629, Office Action dated Feb. 28, 2020", (w/ English Translation), 5 pgs.
"Japanese Patent Application No. 2018-567629, Voluntary Amendment filed Feb. 12, 2019", (w/ English Translation of Claims), 53 pgs.
"Japanese Patent Application No. 2018-567629, Written Argument and Amendment filed May 28, 2020 in response to Office Action dated Feb. 28, 2020", (w/ English Translation), 18 pgs.
"International Application Serial No. PCT/IB2017/053649, International Preliminary Report on Patentability dated Sep. 3, 2018", 13 pgs.
"International Application Serial No. PCT/IB2017/053649, Response filed Jul. 10, 2018 to Second Written Opinion dated May 14, 2018", 12 pgs.
"European Application Serial No. 17734490.0, Communication Pursuant to Article 94(3) EPC dated Jun. 9, 2020", 8 pgs.
"Japanese Application Serial No. 2018-567629, Notification of Reasons for Refusal dated Feb. 28, 2020", 5 pgs.
"European Application Serial No. 17734490.0, Response filed Mar. 20, 2019 to Communication pursuant to Rules 161(1) and 162 EPC dated Feb. 21, 2019", 12 pgs.
"European Application Serial No. 17734490.0, Response filed Dec. 2, 2020 to Communication Pursuant to Article 94(3) EPC dated Jun. 9, 2020", 16 pgs.
"European Application Serial No. 17734490.0, Summons to Attend Oral Proceedings mailed Jun. 17, 2021", 12 pgs.

* cited by examiner

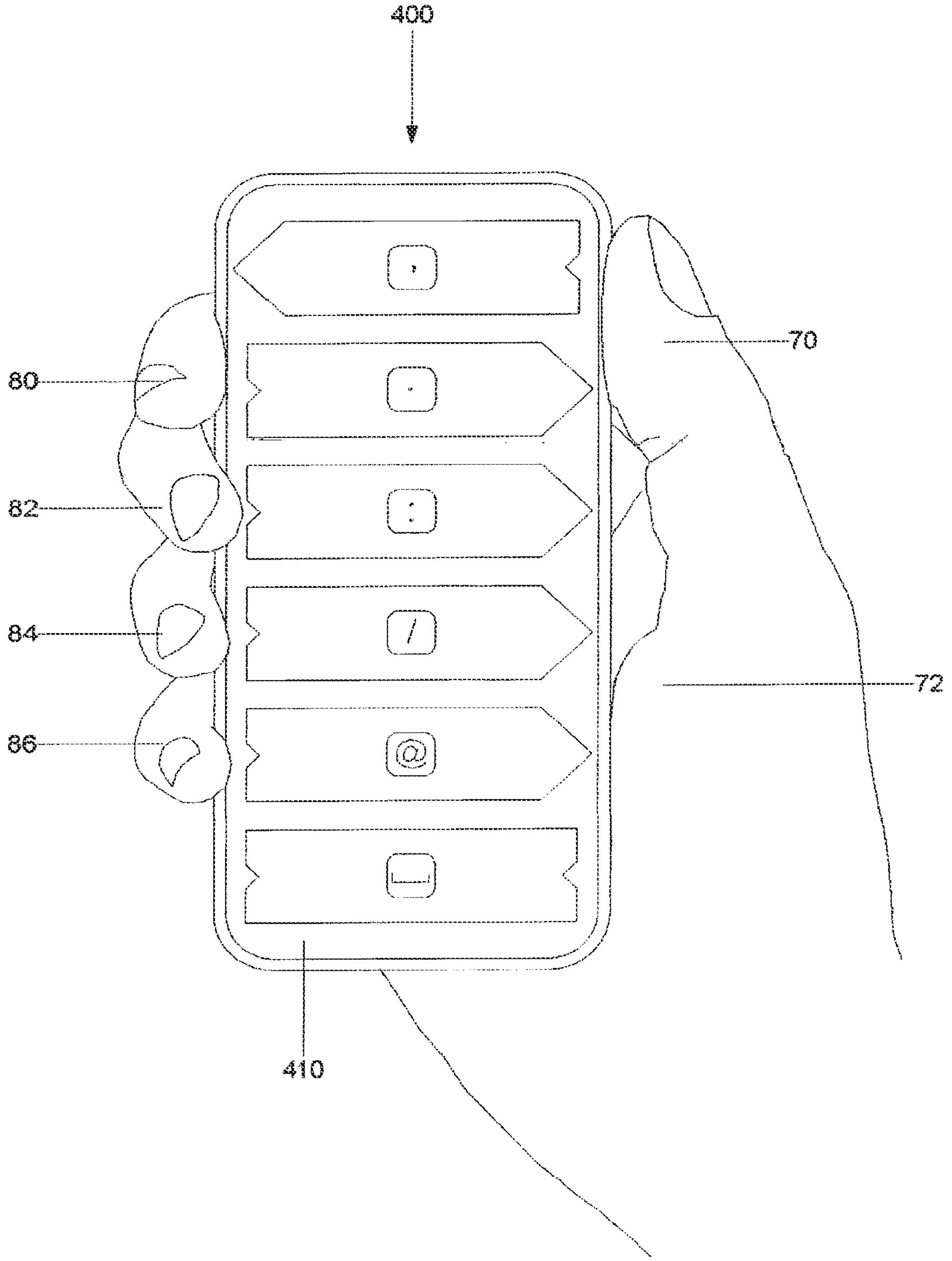
FIG. 6B”

ACCOMMODATIVE USER INTERFACE FOR HANDHELD ELECTRONIC DEVICES

RELATED APPLICATION

This application is a national phase entry under 35 USC 371 of International Patent Application No.: PCT/IB2017/053649 file on 20 Jun. 2017, which claims priority from US Application No. 62/352,070 on 20 Jun. 2010, the contents of which are incorporated in their entirety by reference herein.

FIELD OF THE INVENTION

The present invention is in the technical field of human machine interaction. More particularly, the present invention relates to a tactile user interface for handheld electronic devices that accommodates the human hand irrespective of morphology, size or laterality thus enabling any user to conveniently operate such devices with all five fingers (the thumb included).

DESCRIPTION OF THE RELATED ART

There are two major categories of handheld electronic devices. Some are stand-alone devices like smartphones, conventional cell phones, GPS navigation devices, portable (handheld) digital recorders, laser rangefinders and the like. Others are accessories (peripherals) to physically separate devices which may or may not be electronic devices and, as a rule, are not suited for in-hand operation. For example: handheld (wireless) keypads, keypad microphones, telescope controllers, handheld VR (virtual reality) controllers, presentation clickers, remote controls for TV sets, air conditioners, cameras, drones etc. The front of these devices, i.e. the side facing the user when operating it is equipped with a conventional user interface; for interface purposes the other sides are left unused. The user engages the interface with his thumb, while holding the device with the other fingers. Even though they are more dexterous, the interface design relegates them to holding the device, which does not make good use of the fine motor skills of the hand.

For operational purposes the user interfaces of these devices rely heavily, though not exclusively, on buttons and similar controls like toggles, radio controls, check boxes etc., which the user needs to be able to recognise and reach. For this reason the controls in question (which may be virtual or real) are typically found on the user facing side of the device. This makes them easy to identify but not always easy to reach, particularly when operating the device in-hand, i.e. when holding and operating it with the same hand.

Some prior art places certain controls on surfaces other than the face of the device (mainly the sides), although the user cannot see these when operating a device. Because of this limitation the prior art reflects a somewhat undernourished view of the potential uses of these surfaces. In particular, it confines their use to specific ancillary/subsidiary controls, e.g. start/stop, on/off, volume up/down, zoom in/out, etc. alongside a primary user interface of conventional design on the front of the device. As a rule their location is fixed and their function invariant, setting them apart from the controls of conventional primary interfaces. For navigation or other user inputs, data entry in particular, the prior art offers no alternative to a conventional interface on the user facing side of the device. In any case, the sides of handheld devices do not afford much space. Putting a home screen there or a keyboard or a keypad would be problematic, even setting aside all other considerations.

The Garmin eTrex series of handheld GPS devices, introduced in 2000, is a ease in point. In addition to a primary interface with a thumb stick and a display on the face of the device, it has five buttons on its sides, in particular two zoom buttons, a back button and a menu button, as well as a backlight button, which doubles as a power on/off button (the details are from the Owner's Manual for the eTrex 10, 20 and 30). Each button performs a predefined ancillary function. The zoom buttons zoom in and out respectively, the back button moves back one step in the menu structure and the menu button opens a sub-menu of functions available at the current step. These buttons are mechanical, which permits the user to locate them by feel. By the same token the user has to engage them where they happen to be, irrespective of hand size or handedness, because their location is fixed. The functional interactions with the device are conducted through the display using the thumb stick. To enter a waypoint, for example, the user picks letters (to give it a unique name) and numbers (representing its value) from a minuscule keyboard by means of the thumb stick, a rather tedious process.

U.S. Pat. No. 7,800,592 discloses a device with virtual buttons on its sides, i.e. discrete delimited touch sensitive areas, referred to as touch buttons, instead of mechanical buttons. To actuate one the user has to push it, i.e. to press or tap within its clickable (active) area. Like the mechanical buttons of the eTrex, the touch buttons of U.S. Pat. No. 7,800,592 control a limited set of subsidiary functions, for instance the next, previous, volume up, volume down and/or play/pause functions of a music player. Other user inputs are conducted through a conventional touch sensitive display on the front of the device.

A major drawback of U.S. Pat. No. 7,800,592 stems from the fact that the virtual buttons are flush with the sides of the device and are therefore difficult to locate because, when operating the device, the user can neither see them nor fed them.

U.S. Pat. No. 8,988,359, proposes a method configured to associate specific functions, in particular call handling and operating a music player (play, stop and pause), with a specific finger in order to enable the user to execute the function associated with a finger regardless of where it touches the device. All the user needs to remember is the function associated with a finger, without being concerned about touching the device in a particular predetermined position.

Another patent, US20140375582, proposes "[a] method of controlling an electronic device using grip sensing, the method comprising: determining a grip pattern on the electronic device; and controlling a predetermined function according to the grip pattern." What a "grip pattern" is unclear. The examples of "control" the specification gives, in particular locking and unlocking, power on/power off, volume control, zooming, rotation lock, page up/down, suggests the scope of the term is limited to ancillary functions. The systems architecture of US20140375582 makes it clear that grip sensing is not the primary interface modality. It shows a separate and independent input/output module in addition to a sensor module for detecting and processing grip patterns.

A major disadvantage of current designs, those with touch screens in particular, is their vulnerability to unexpected and unwanted behavior triggered by unintentional contact with the interface. This detracts from a smooth and responsive user experience and frustrates users. The propensity towards this sort of mishap is the effect of (i) the inherently reduced dexterity of the thumb with its limited number of phalanges, fixed pivot and low angle of attack, (ii) the size of the thumb, which makes it difficult to aim at small targets, (iii) the minimal or missing profile of the targets and their close spacing and (iv) the high sensitivity of capacitive touch-screens.

Furthermore, in sweeping over the display like a wind-shield wiper the thumb eclipses a non-negligible part of its content (as does any finger used in its stead). This may hide important visual landmarks.

Often the interface layout is manifests a bias towards right hand use. At times, this may be offset by a mechanism to reconfigure the interface for left hand use, at the expense of added complexity. (For instance, grip sensing could be used to determine which hand the user is holding the device in and to configure the interface accordingly.)

Controls that are not actuated mechanically, like the virtual controls on touch-screens, cannot be operated by feel, which necessitates their being within sight. This can be an issue for users with impaired vision or in case the user's attention when operating a device is elsewhere, e.g. when using a TV remote control.

Where relevant and as a rule, the interfaces of handheld devices, in particular the prior art cited above, feature a keyboard or keypad for data entry, or both. To fit, these are scaled down to the point where the disproportionately small size and close spacing of their keys degrades their operability. Thus, when typing, a user has to exercise significant care. Entering text is cumbersome and slow. Accuracy is compromised. Keypads involve additional operational complexity, because each key serves to generate anywhere between one and four characters.

A good deal of engineering effort has gone into shoring up the weaknesses of the current designs, e.g. workarounds like styluses to tap the keys or loupe tools that magnify a portion of the display as well as algorithms to detect and ignore stray keystrokes or to resolve ambiguities. To reduce the amount of keying required to enter text, techniques like auto-completion and auto-correction are used.

Nevertheless, users still feel the need to resort to tactical workarounds to make up for the operational shortcomings of the design. Common expedients are to hold the device with one hand while engaging the interface with the other or to type with two thumbs (while cradling the device in both hands). Both workarounds defeat the essential purpose of devices meant for in-hand use.

| TERMINOLOGY | |
|---|---|
| Base of Thumb | Fleshy area of the palm of the hand at the root of the thumb, the thenar eminence. |
| Contact Patch | A portion of the hand, in particular of a finger tip or of the base of the thumb, that touches the device. |
| Continuous Sensor Region | A sensor region the sensors of which respond proportionately to a contact patch anywhere within the sensor region regardless of its location |
| Control Signal | Signal the interface generates upon detecting a sign in order to actuate a function of the device. |
| Distinctive Features | Attributes of a contact patch that serve to distinguish one sign from another, e.g. its pressure, location and size. |
| Fingers | As used herein "finger" refers to any and all of the index, middle, ring and little finger and the thumb of the human hand and only these digits. |
| Interface | The term "interface" refers to the entire subsystem from the sensors to the processors that produce control signals. |
| Sensor Region | Region of the interface surface configured with sensors to detect and track contact patches. |
| Sign | The combined distinctive features of each of the six contact patches the hand makes when holding the device in a handshake like grip. |
| Standard Configuration | A spatial configuration of contact patches consisting of a column of four contact patches opposite a column of two contact patches. |

SUMMARY OF THE INVENTION

An object of the invention is to provide a user interface for handheld electronic devices that offers ease of use and that is versatile.

Another object of the invention is to provide a user interface for handheld electronic devices that allows efficient access to the functions of the electronic device with one hand only.

Another object of the invention is to provide a user interface for handheld electronic devices that makes optimal use of the fine motor skills of all fingers of the hand.

Another object of the invention is to provide a user interface for handheld electronic devices that relies on the natural movements of the hand and fingers and does not involve contortions.

Another object of the invention is to provide a user interface for handheld electronic devices that can accommodate the hand morphology, hand size and handedness of any user (without adaptation).

Another object of the invention is to provide a user interface for handheld electronic devices that allows accessing its functions without impairing the visibility of its display, where there is one.

Another object of the invention is to provide a user interface for handheld electronic devices that avoids stray contacts with the interface.

The invention provides a method and apparatus that make it possible to use the five fingers of the hand holding a handheld electronic device naturally, in a handshake like grip, to operate it. The term "finger" as used herein refers to any and all of the index, middle, ring and little finger and the thumb of the human hand. The term "interface" refers to the entire subsystem from the sensors to the production of control signals that actuate the functions of the device.

With the user holding the device in a natural manner, the interface of the present invention tracks specific attributes of the contact with the hand holding the device, in particular the fingers, and converts these into control signals. In contrast with conventional interface designs, where operative contacts with the interface occur at set locations laid out in the manner of a control panel, the operative contacts occur as and where the hand touches the interface when holding the device, which varies from user to user and changes whenever a user moves a finger. There are no predetermined active spots that the user's finger must connect with. Accordingly, the present invention provides an interface for handheld electronic devices with a systems architecture comprising an outer surface and one or more uninterrupted regions on said outer surface with which the hand is in contact when holding the device. These regions, called sensor regions, are configured with sensors to detect and track the areas where the hand and the interface actually touch, called contact patches.

To respond proportionately to a contact patch anywhere within the sensor region, its sensor or sensors are configured to cover the sensor region uniformly without any gaps or discontinuities. A sensor region configured for this is said to be continuous.

The sensors are furthermore configured to detect and track multiple simultaneous contact patches within a sensor region made by one or more fingers and/or the base of the thumb of a hand. The systems architecture of the interface may also comprise a processor connected to one or more sensors. The processor s configured to control an electronic device by tracking specific attributes of one or more contact patches and mapping the data obtained to a signal for controlling the electronic device or for inputting data. The processor identifies a particular contact patch a hand makes based on its relative location with respect to the other contact patches the hand makes.

In one embodiment of this invention a processor function may be implemented using a single processor.

In another embodiment a processor function may be implemented using a multiplicity of processors.

In one embodiment his invention a sensor function may be implemented using a single sensor.

In another embodiment, a sensor function may be implemented using a multiplicity of sensors.

In one embodiment of the present invention, the processor is configured to determine the relative location of a particular contact patch with respect to the other contact patches the hand makes with reference to a spherical coordinate system with a center-bottom origin on the electronic device by comparing an azimuth θ and either a radial distance r or a polar angle φ of its centroid. Embodiments based on a different coordinate system or a different origin are also within the scope of the invention.

In another embodiment, the processor is configured to determine the relative location of a particular contact patch with respect to the other contact patches the hand makes with reference to two or more sensor regions on opposite sides of the device which the user's hand comes into contact with when holding the device in a handshake like grip.

In another embodiment of the present invention, the processor is configured to recognize a standard configuration of six contact patches where each contact patch in the standard configuration is located at a position where a finger or the base of the thumb of a hand would naturally come into contact with the outer surface of the interface when a user is holding the electronic device in a handshake like grip in order to use it. Control of the electronic device by the processor is not initiated unless the standard configuration is recognized. Thus, the processor is configured to ignore contact patches unless the processor detects that all five fingers of a hand and the base of the thumb are in contact with the sensor region or regions and where the contact patches the index, middle, ring and little fingers make are opposite the contact patches the thumb and the base of the thumb make. For instance, the processor would ignore the contact patches a user would make when holding a device between the index and middle fingers on one side and the thumb on the other, as the user might do to show the display of the device to another person.

In one embodiment, the user interface of a handheld electronic device generates a signal for controlling a specific function/action of a device, henceforth control signal, on the basis of information received from the contact patches on the sensor region or regions.

In one embodiment of the present invention, the interface is an integral part of a stand-alone electronic device comprising both the interface and a functional component that the interface controls. In this embodiment, the interface communicates the control signals it generates on the basis of information received from the contact patches on the sensor region or regions to the functional component of the device through standard internal connections.

In another embodiment, the interface is an integral part of an electronic device that is an accessory (peripheral) to a separate device comprising a functional component which the interface controls. In this embodiment, the accessory device comprises the interface and generates control signals which are received by the controlled device. Both devices may involve additional components to encode, decode, transmit, and receive the control signals from one to the other. Thus, the accessory device can communicate with the device it controls by wireless technology such as Bluetooth, infrared light etc. or by a physical connection such as a wire or fiber-optic cable. The separate device may or may not be an electronic device or suited for in-hand operation. The accessory device may be configured to snap onto the device it controls or may be configured to flexibly mold around or otherwise attach to it.

In another embodiment the accessory (peripheral) device may be mounted on or incorporated in a physical support that may not be the device it controls. For instance, the motor controller of an electric bicycle may be incorporated in the grip of the handlebar. Or, a remote control device for the GPS (or the windows or the radio) of a car could be attached to the steering wheel in the manner of a steering wheel cover or, alternatively, it could be embedded in the steering wheel as an integral part.

In another embodiment, the accessory (peripheral) device could be incorporated in the armrest of a seat or in a console associated with a seat to enable the operation of an associated system of some kind. The seat may be static or part of a vehicle like a wheelchair or an aircraft. The associated system may be an audio-visual system like an entertainment system or a mechanism to adjust the configuration of the seat e.g. the angle of the seat back. Alternatively, it could be a drive and steering mechanism related to the seat, e.g. a powered wheelchair, or attached to the seat for ease of access.

In one embodiment of the present invention, at least one of the one or more continuous sensor regions is located on the side or sides of the device.

The sensor region or regions are configured to detect the effects basic finger movements such as pushing, lifting, or changing position have on the contact patch made by the finger performing the movement. The sensor region can also detect the effects of multiple simultaneous finger movements. The absolute location of each contact patch the hand makes within the one or more continuous sensor regions varies depending on the hand morphology, hand size, and handedness of the user and as a result of intentional finger movements the user makes to operate the device as well as variations/inconsistencies in the way the user holds it. The relative location of the contact patches with respect to one another, however, is constant for all users.

In one embodiment, the interface of the present invention can be integrated with the outer surface of stand-alone electronic devices including, for example, handheld devices such as smartphones, conventional cell phones, GPS navigation devices, portable (handheld) digital recorders, Geiger counters, metal detectors, laser rangefinders and the like. Other embodiments of the present invention are accessories (peripherals) to separate devices which may or may not be electronic devices or suited for in-hand operation, for example: presentation clickers and other remote controls e.g. for TV sets, air conditioners, and cameras as well as handheld VR (virtual reality) controllers, handheld (wireless) keypads, keypad microphones, and telescope controllers etc.

Most conveniently, the sensor regions of the interface are located on the side or sides of the electronic device embodying the interface so that these regions cover the areas the hand naturally touches when the user is holding the device in a handshake like grip to use it.

In some embodiments, the sensor region or regions may extend to the back or top or bottom surface of a device where they can be used as part of the interface of the present invention or additional sensor regions may be present in these area.

Other systems, methods, features and advantages will be, or will become, apparent to one with skill in the art upon examination of the following figures and detailed description. It is intended that all such additional systems, methods, features and advantages be included within this description, be within the scope of the invention and be protected by the following claims.

BRIEF DESCRIPTION OF THE DRAWINGS

The accompanying drawings, which are incorporated herein and constitute part of this specification, illustrate exemplary aspects of the invention. Together with the general description given above and the detailed description given below, the drawings serve to explain features of the invention.

All drawings except FIG. 6A show the device illustrated from the perspective of the user holding it, i.e. from the front.

FIG. 6B' shows a perspective view of the device of FIG. 6B held in a handshake like grip in the right hand with the entries of the third row of the display of FIG. 6B transposed into a column;

FIG. 6B" shows a perspective view of the device in FIG. 6B held in a handshake like grip in the right hand with the entries of the sixth row of the display of FIG. 6B transposed into a column;

FIG. 6D' shows a perspective view of the device in FIG. 6D held in a handshake like grip in the right hand with the entries of the second row of the display of FIG. 6D transposed into a column;

DETAILED DESCRIPTION OF THE INVENTION

Figure 1A:
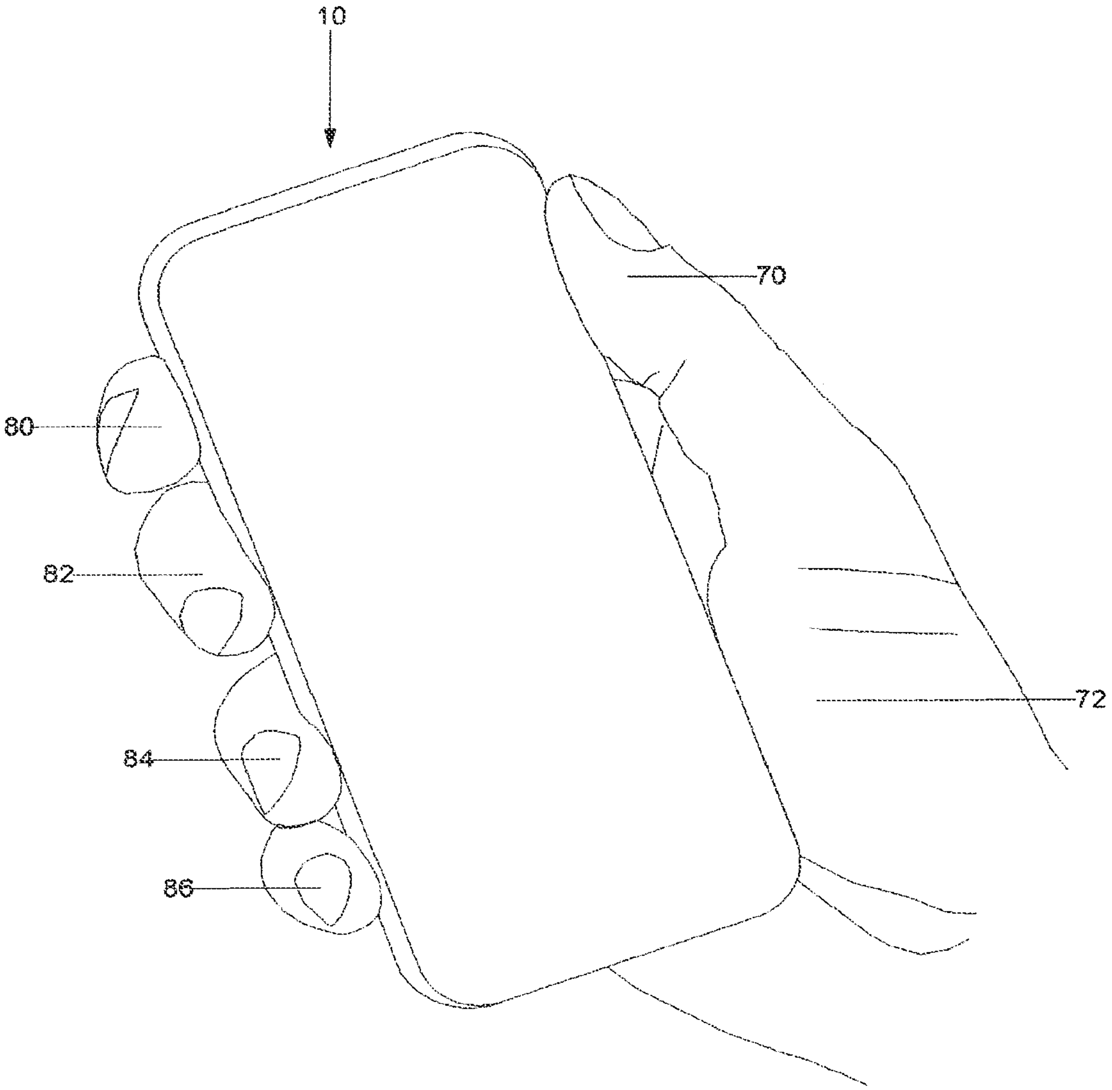
FIG. 1A is a perspective view of a generic handheld device held in the right hand.

The invention provides a method and apparatus that enable the in-hand operation of handheld electronic devices by modulating the contact patches the fingers of the hand holding the device make by means of finger movements involving any and all fingers, not just the thumb 70. The device may be a stand-alone device or an accessory (peripheral) to another device with which it is functionally linked. A stand-alone device is a complete and independent unit that encompasses all essential functions associated with it; an accessory (peripheral) device is a device that has utility in conjunction with a separate associated device. Handheld electronic devices may have a variety of shapes e.g. a slab, slate, candy bar, cylinder, semi-cylinder, capsule, semi-capsule, tablet, disk, sphere, ellipsoid solid, lentil shaped solid etc. as well as variations of these. FIG. 1A shows a generic handheld device 10 in the form of a rectangular tablet with rounded corners. It may or may not have a display on the front. Detailed examples of two other shapes will be presented below. In one the device is in the shape of a cylinder (FIG. 4), in the other it is in the shape of a disk (FIG. 5). As a rule, the devices have separate left and right edges (but the cylinder in FIG. 4 and the disk in FIG. 5 do not) and have a front and a back (but the cylinder in FIG. 4 does not).

Figure 2A:
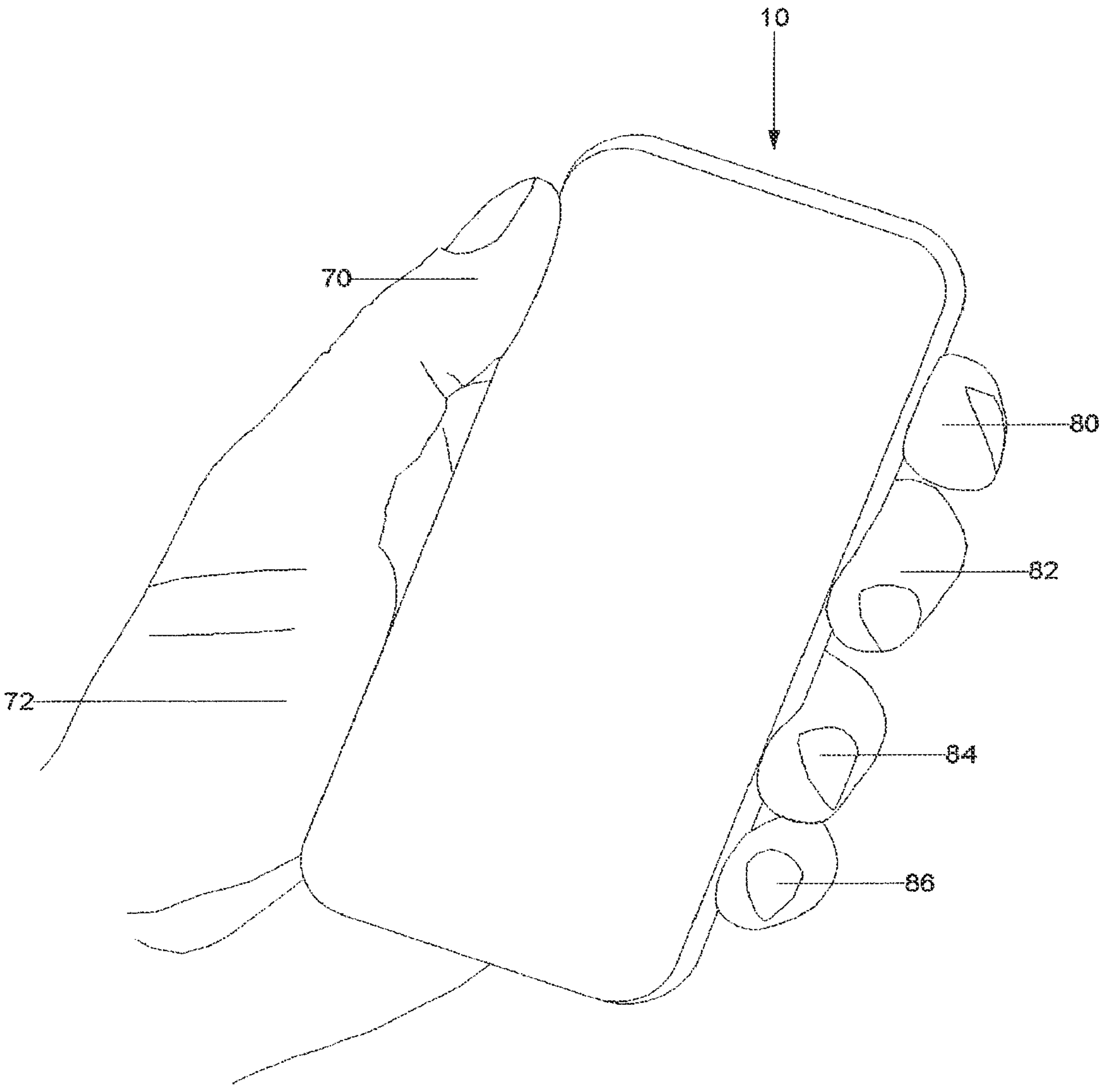
FIG. 2A is a perspective view of the device of FIG. 1A held in the left hand.

When operating a handheld electronic device in-hand the hand serves two functions. The first is to hold the device and the second is to interact with its interface. Conventional interface designs, employ the fingers of a hand for one or the other function, not both. When operating a device in-hand, the user interacts with the interface with the thumb 70, while gripping it between the base of the thumb 72 and the other fingers or cradling the device in the palm of his hand. Operating a device in this fashion may involve contortions of the thumb, for instance bending it so that the two phalanges are at a right angle. In any case, it leaves the other fingers, which are more dexterous, to do nothing but hold the device. With the invention every finger serves both functions, each in accordance with its motor capabilities. To use a handheld electronic device in a natural manner, the user holds it by its lateral surfaces in a handshake like grip between the thumb 70 and the base of the thumb 72 on one side and the index 80, middle 82, ring 84 and little 86 fingers on the other. This is shown in FIGS. 1A, 2A (for the left hand), FIG. 4 and FIG. 5. The front of the device is in full view and its back faces the palm of the hand.

Whenever this specification refers to holding a device or it being in the hand of a user, what it means is that the user is holding it in order to operate it in the natural manner just described. Other ways of holding the device, e.g. to hold it so as to show the display to someone or to put it away etc. are not the subject of this specification.

Figure 1B:
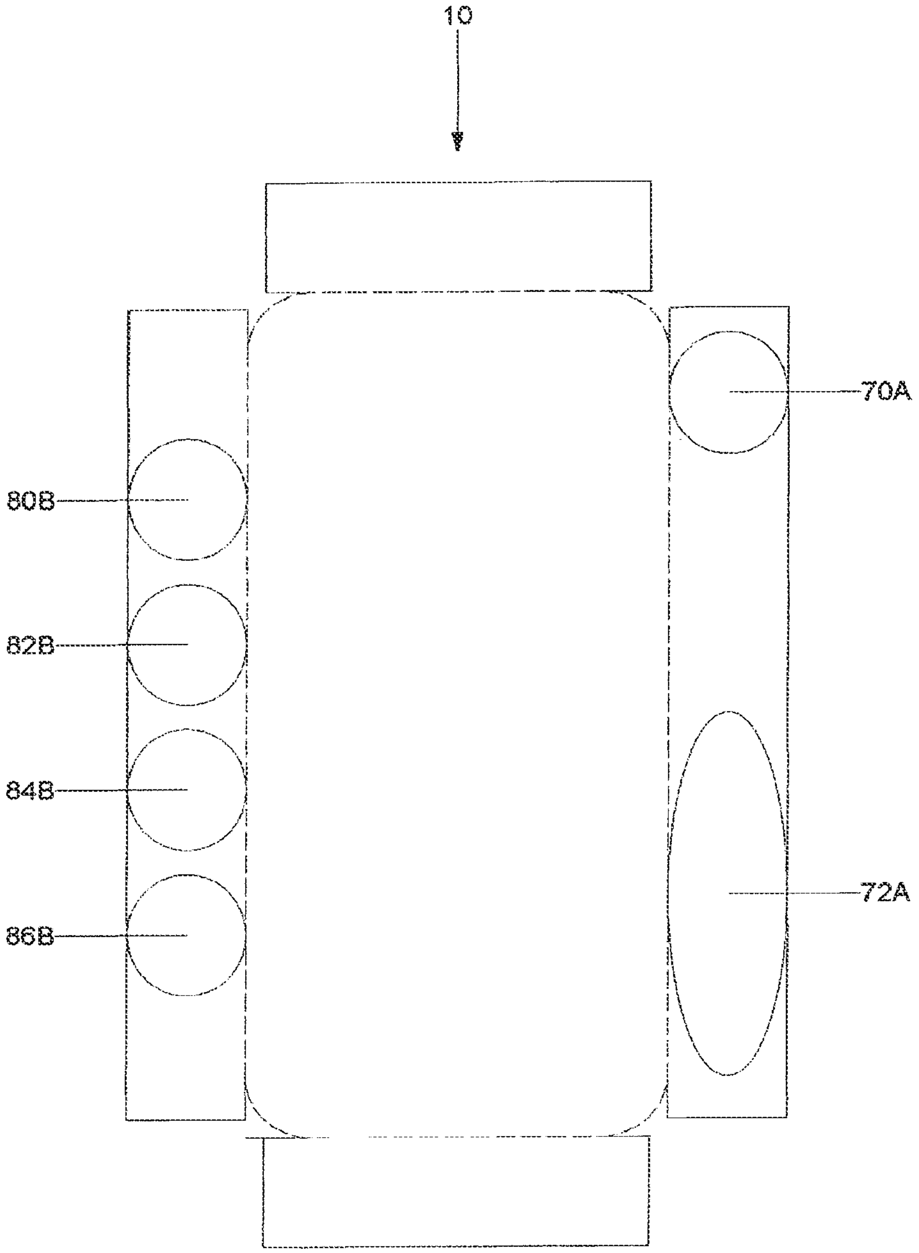
FIG. 1B is an exploded view of the rear and lateral surfaces of the device of FIG. 1A showing where the fingers and the base of the thumb touch the device when the user is holding it in the right hand.

The six circled areas in FIG. 1B represent the contact patches the hand makes on the device in FIG. 1A when holding and operating it in a natural manner, in particular the areas where the hand is in contact with the interface. Five are the contact patches the finger pads make, one is the contact patch the base of the thumb 72 makes. Their absolute location will change in the course of operating the device and will vary from user to user. Their relative location with respect to one another, though, is constant. In particular, the contact patches are in two columns: one column having two contact patches and the other column having four contact patches. The first column, which will be referred to as column A, comprises the contact patches the thumb 70A and of the base of the thumb 72A make. The second column, column B, comprises the contact patches the index finger 80B, middle finger 82B, ring finger 84B, and little finger 86B make. This arrangement of the contact patches is referred to as the standard configuration. It is vertically asymmetrical: the elongated contact patch the base of the thumb 72A makes is at the bottom. The absolute location of the contact patches will vary with the hand morphology, hand size, and handedness of the user and as a result of intentional finger movements the user makes to operate the device as well as variations/inconsistencies in how the user holds it.

The interface interprets the six contact patches the hand makes as a single input, hereinafter referred to as a sign. As long as they are in standard configuration, they constitute a bona fide sign that the interface detects, interprets and converts into a control signal or a data item. Contacts not in standard configuration will be rejected. A contact patch is qualitatively different from a virtual button. In particular, it is not a predefined area within which the user must touch the interface. Rather, a contact patch is a manifestation of a hand touching a device, specifically it is the area actually in contact. Its absolute location is not predetermined, not like that of a button. Where it occurs is a function of a number of factors, in particular the morphology of the user's hand and the shape of the device as well as intentional finger movements the user makes to operate the device and inconsistencies in the way a user holds a device from one occasion to another. Furthermore, a single contact patch cannot trigger a function by itself. The identity of a sign is determined by the aggregate of the distinctive features of each of the six contact patches composing it. More directly.

Figure 2B:
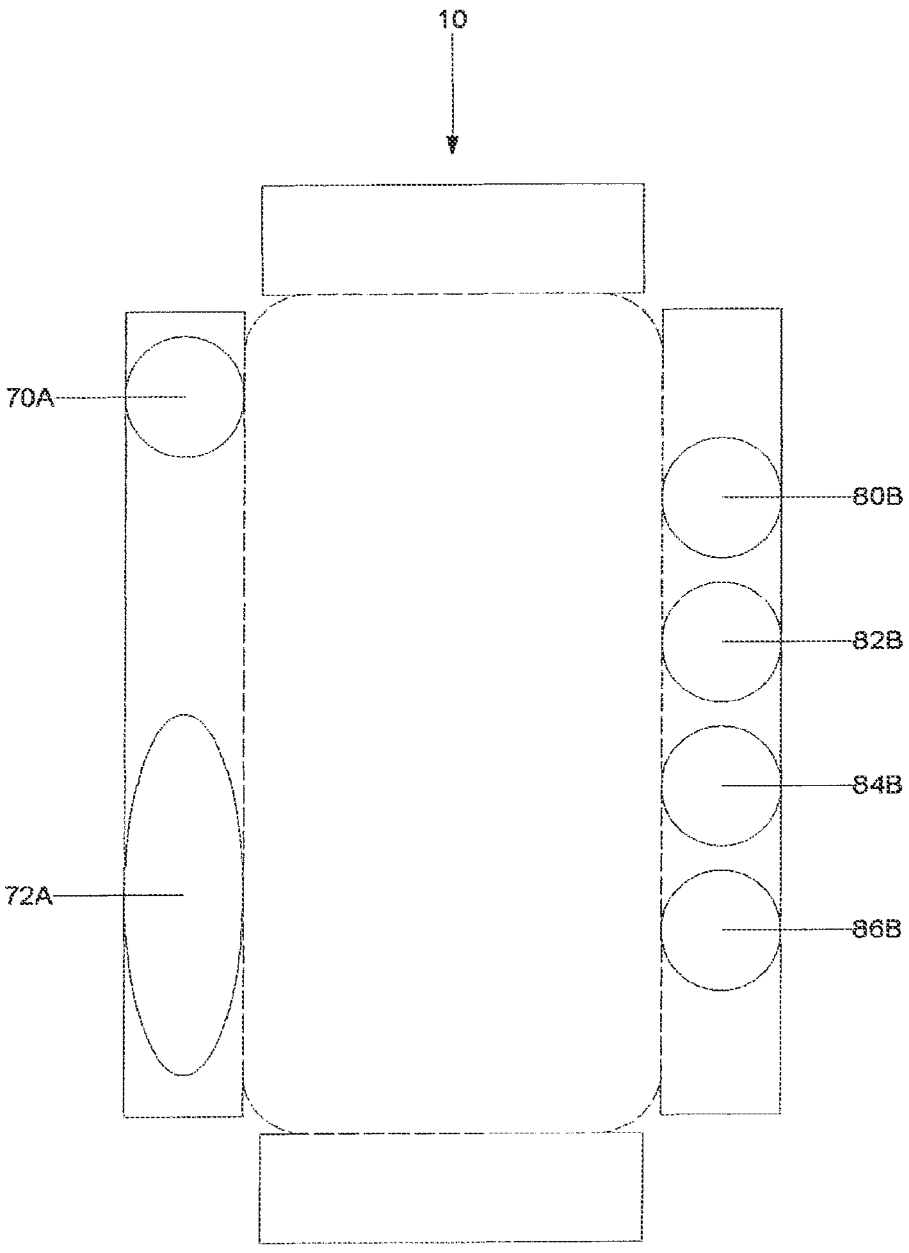
FIG. 2B is an exploded view of the rear and lateral surfaces of the device of FIG. 1A showing where the fingers and the base of the thumb touch the device when the user is holding it in the left hand.

No matter what hand a device is in, as long as the user is holding it in a natural manner, i.e. in a handshake like grip, the contact patches the hand makes will be in standard configuration: a column of two contact patches opposite a column of four contact patches. The difference between holding a device with the right hand (FIG. 1A) or the left (FIG. 2A) is the left to right order of the columns when seen from the same side (compare FIG. 1B with FIG. 2B), but this is not a factor. The distinctive features of the contact patches, which in the aggregate define a sip, are the same regardless of where the interface detects them. Users make the same signs with the right hand or the left; consequently the distinctive features of the contact patches that the interface detects will be the same no matter the hand that has made them. There is no functional difference between using the interface of the invention with the left hand or the right. There is no need to configure it for handedness. For this reason a statement of the modalities of operating devices with the right hand will suffice to describe the invention. A separate description of how to operate devices with the left hand would be redundant.

Physically the sensor regions of the interface of the invention may take in substantially all surfaces of the device that the hand may come into contact with when holding it, essentially the unseen sides of the device, i.e. the lateral surfaces and the back. To hold the device, the fingers are in sustained contact with its user interface. This rules out the use of binary controls that the user actuates by touching them momentarily, such as buttons, keys of a keyboard, menu items, toolbars, hyperlinks etc. To operate a device with the interface of the invention the user makes signs while keeping his grip on the device. To make signs different from one another the user makes finger movements that alter the distinctive features of one or more contact patches. The distinctive features include but are not limited to the pressure at the contact patch, its size, its location, particularly the location of its centroid. It will be obvious that bearing down with a finger will increase the pressure at the contact patch (and at the same time increase its size) and that changing the position of a finger on the interface surface will alter the location of the centroid of the contact patch, to give two illustrations of distinctive features of contact patches susceptible to change as a result of finger movements.

The contact patch the base of the thumb 72A makes is not subject to voluntary control. The user can not deliberately alter its distinctive features (except perhaps its pressure). Because of this it is not directly involved in modulating signs. But it makes for a better grip on the device. It also permits the thumb 70 to freely interact with the interface by providing an alternate abutment for the fingers gripping the device from the opposite side. And, as mentioned above, since the contact patch the base of the thumb makes is substantially larger than the others, it imparts a vertical orientation to the standard configuration. Which way up the user holds the device is immaterial insofar as the interface is concerned. With a suitable device, this property can be used to show the contents of the display in a vertical orientation that corresponds to the way the user is holding the device irrespective of its physical orientation. A round device, like the one in FIG. 5, has no intrinsic vertical orientation. The ability to orient the contents of its display according to how the user is holding it is a necessity.

A defining feature of the invention is that the user interface is not characterised by discrete targets in a predetermined layout, like the keys of a keyboard or the controls of a control panel, which the user can actuate with any finger. Each user engages the interface with all fingers together with the base of the thumb where these naturally come into contact with it when holding the device in a handshake like grip. The user does not even have to see the interface to use it; there are no fixed targets for his fingers to hit.

Where a user's hand touches the device is where it engages the interface. The interface accommodates all users as is, i.e. without first adapting to the individual user. The contact patches the user's hand makes engage it as and where they occur. As long as they are in standard configuration, the aggregate of the distinctive features of the contact patches constitutes a bona fide sign. A sign is defined by the composite of the distinctive features of the contact patches the user makes with his hand. Only bona fide signs map to a signal capable of controlling the operations of the device or to a piece of data.

In this respect current interface designs are the opposite of the invention. Most contacts with the interface must occur within a predefined layout that the user must employ as it is. This leads to situations where the interface needs to be scaled or otherwise adjusted to bring the controls within the reach of the users thumb, for instance to configure it for left and right handed users. The layout of the interface is determined by design decisions which often subordinate ergonomic requirements to considerations of system and order and at times to technological constraints, even outdated ones like the QWERTY keyboard.

Even just holding a device constitutes a bona fide sign but has no effect on the functions of the device. Rather, the sign consisting of the distinctive features of the six contact patches the hand makes when holding the device represents a baseline for the operational signs. The following schematic represents the fingering of this sign, i.e. what each finger does to generate it. The format of this schematic will be used throughout this specification to represent the fingering of signs. A hollow bullet O indicates a finger holding the device without pressing on it or moving. The headings at the foot of the contact patches columns indicate the part of the hand that makes the respective contact patch. To facilitate referring to signs, they are numbered starting with 0.

Baseline Sign

| Mode | | | Contact Patches | | | | | |
|---|---|---|---|---|---|---|---|---|
| No | Command | Data | SOB | 82B | 84B | 86B | 70A | 72A |
| 0 | nil | nil | ○ | ○ | ○ | ○ | ○ | ○ |
| | | | Index | Middle | Ring | Little | Thumb | Base |

The device can be configured to unlock when it detects the baseline sign. Conversely, it can be made to lock when it has not detected a valid sign for an appropriate interval. All signs not in the form of six contact patches in standard configuration are without effect. This for all practical purposes eliminates the possibility of triggering unintentional operations, e.g. pocket dialing, while carrying or otherwise handling the device.

To operate the device as opposed to just hold it for the purpose of operating it, the user modulates the preceding sign by means of finger movements that alter the distinctive features of one or more contact patches. An example could be pressing with the thumb 70. When not actively interacting with the interface, the hand spontaneously reverts to the unmodulated baseline sign. Throughout, the user maintains his grip on the device.

Finger Movements

What the user can do with a finger while holding a device is conditioned by the dual function of the fingers. The freedom of movement of individual fingers is constrained to varying devices by holding the device. A further constraint are involuntary linkages between the fingers known as enslavement effects. Besides, not all fingers are equally dexterous; some can perform movements the others cannot. Not all fingers can perform all movements. The weak fingers in particular, i.e. the ring finger 84 and the little finger 86, are more limited than the others. Nevertheless within the bounds of these constraints, the user can modulate the baseline sign in a sufficient number of ways to be able to generate all the distinct signs needed to operate even relatively complex devices like smartphones in-hand. This will be shown below.

The base of the thumb 72, as already mentioned, is not subject to voluntary control; therefore it does not enter into consideration here.

There are three basic ways in which the user's fingers can act on the interface surface. A finger can push down on it, slide across it and lift off it and thereby change specific physical attributes of the contact patch it makes on the interface surface, in particular its size, pressure and location (specifically the location of its centroid). Other attributes of a contact patch such as its temperature or moisture are not subject to voluntary control. The sensor or sensors the interface is equipped with are configured to monitor the distinctive features of the contact patches, i.e. the attributes relevant to operating the device, and to transform changes exceeding a threshold level into raw signals the processor can interpret. In turn the processor is configured to recognize higher order generalizations of the raw signal such as the timing, intensity, speed, and/or direction of the basic movements. When changes in the raw signal are significant, i.e. when they constitute a unqualified change in the distinctive features of one or more contact patches, a change that transforms one sigh into another, then the processor produces the control signal or data item the new sign maps to. (The mode in which the interface is may determine the result; see below.)

The user can make functionally distinguishable signs by finger movements combining or otherwise structuring basic finger movements to impart a pattern, a kind of coding, to the composite movement. This permits a finger to produce additional functional signals. Examples of such composite movements are press (push, lift), multiple press (repeated presses), long press (press, wait, lift), scroll (press, slide in a single direction, lift), point (press, slide along a random path, lift), swipe or fling (press, fast slide, lift). These examples illustrate patterns based on the duration, repetition, speed and/or direction of a basic movement. To make functional use of such patterns the processor must be configured to recognize them in the raw signal a contact patch generates and to convert them into the corresponding control signal or data item.

The interface is also configured to identify the part of the hand, in particular the finger, generating a contact patch, which makes it possible to differentiate between otherwise indistinguishable contacts with different fingers and to map them to distinct control signals or pieces of data. This multiplies the number of signals available to operate the device. Without the ability to tell fingers apart, pressing one finger has the same effect as pressing any other.

Figure 3:
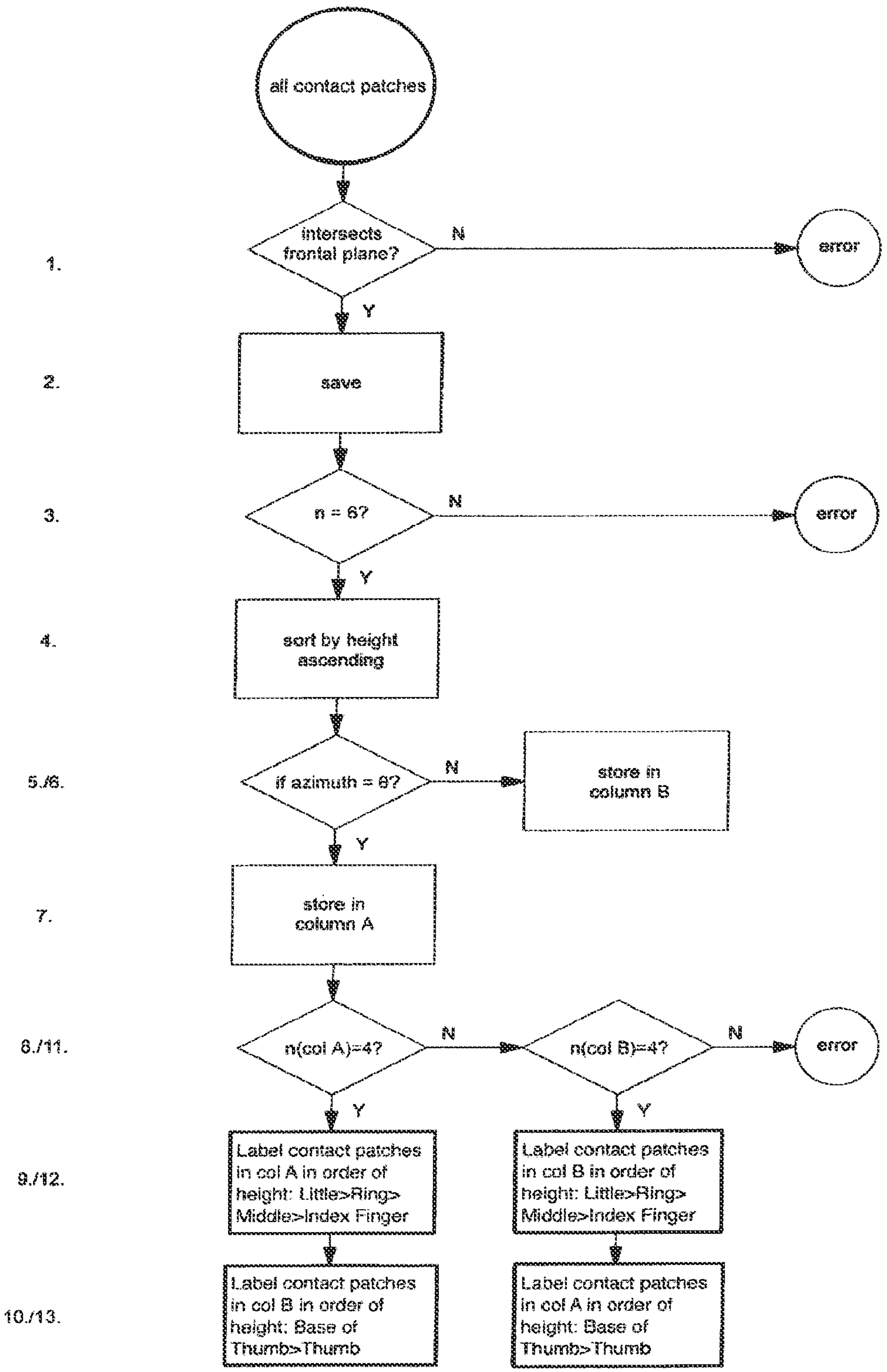
FIG. 3 is a flow chart outlining the algorithm for determining the finger producing a particular contact patch.
Figure 3A:
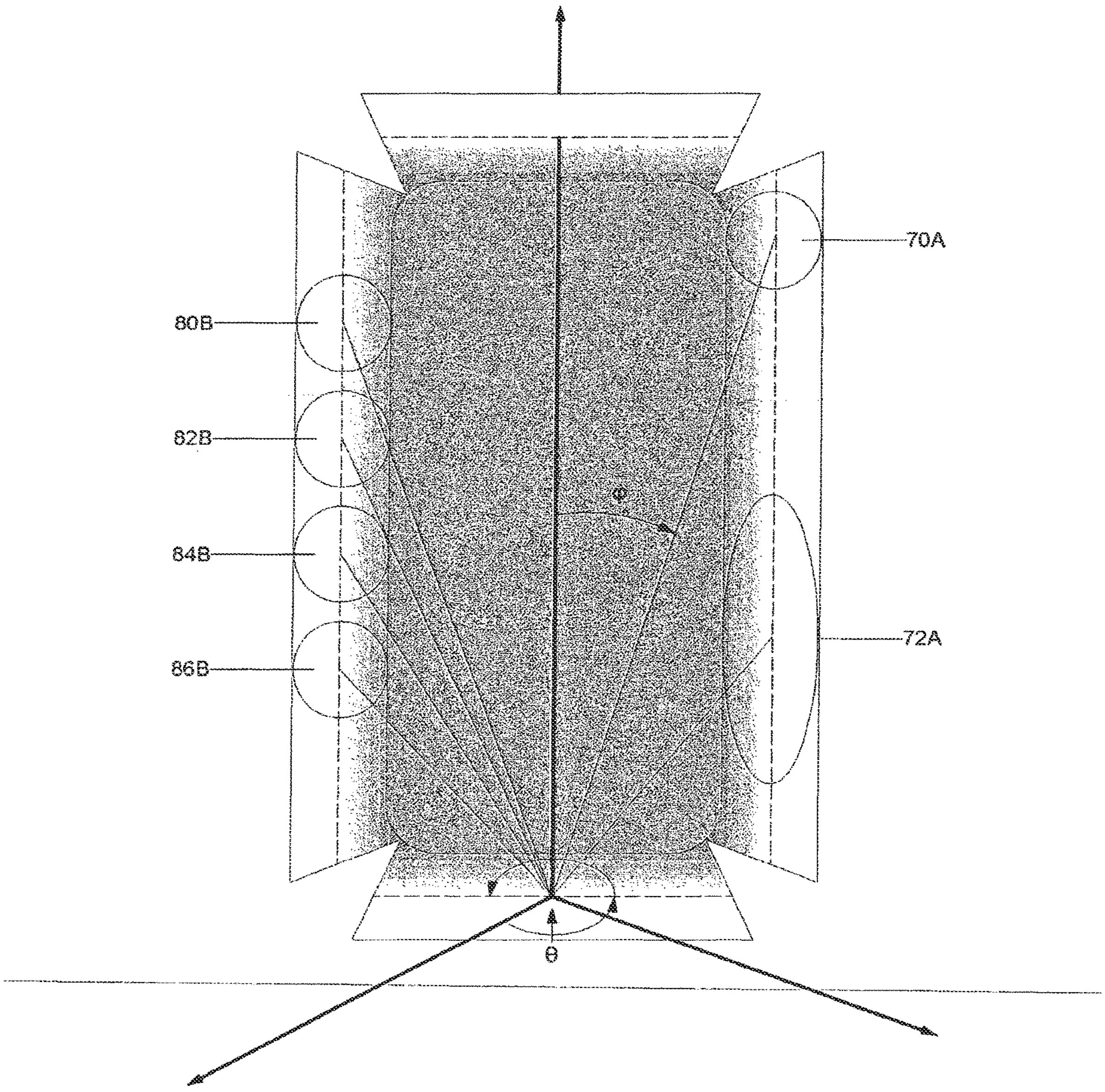
FIG. 3A is a spherical coordinate system superimposed on an exploded view of the rear and lateral surfaces of the device of FIG. 1A showing the azimuth θ and a polar angle φ of the points of where the hand touches the device.

An algorithm to determine which part of the hand the contact is with, viz. a finger or the base of the thumb, is outlined in the flowchart of FIG. 3. It makes use of the relative locations of the contact patches the hand makes, not of any inherent feature of the linger (or part of the hand) generating it. In particular, it does not rely on information stored in a user profile such as a fingerprint or on information of a statistical nature. In addition to identifying the contact patches, the algorithm validates the sign by ensuring that the contact patches composing it are in standard configuration. Based on the spherical coordinates of the centroid of the contact patches made by the hand, shown in FIG. 3A, the algorithm 1. filters out contact patches that do not intersect the frontal plane of the device, i.e. those whose azimuth (within reasonable tolerances) is not θ or θ+180 degrees (At times, the azimuth of a finger may be outside this range, e.g. when the index finger 80 is pointing (i.e. making sign 3, see below); allowance has to be made for this);
2. saves those satisfying this requirement;
3. verifies that there are six such contact patches. (There may be transient discontinuities in contact between a finger and the interface, e.g. when scrolling with a finger (i.e. making signs 2 or 8, see below); allowance has to be made for this.) If so, the procedure
4. sorts the contact patches in the order of their distance from the origin of the coordinate system as measured by the radial distance r or the polar angle φ of their centroid (central point);
5. separates the contact patches according to their azimuth and
6. stores them as column A (if azimuth θ) and
7. stores them as column B (if azimuth=θ+180);
8. tests whether there are four contact patches stored in column A.

If so, the procedure 9. labels these from lowest to highest, the lowest being the little finger and
10. labels the two in column B from lowest to highest; the lowest is the base of the thumb 72.

If not, the procedure 11. verifies that there are four contact patches stored at column B and
12. labels these from lowest to highest, the lowest being the little finger and
13. labels the two in column A from lowest to highest; the lowest is the base of the thumb 72.

It should be noted that not all steps of the algorithm are critically ordered; some can be executed in a sequence that is different from the one shown above.

With a device that has distinct and opposite lateral edges, the device in FIG. 1 tier instance, it is possible to determine which part of the hand the contact is with, viz, a finger or the base of the thumb, by configuring its edges with separate and distinct sensors regions and storing the contacts detected on one side as column A and those detected on the other side as column B and then executing steps 8 to 12 of the algorithm.

The following table shows a basic set of ten signs generated with just three finger movements—pressing, scrolling and pointing—to illustrate what is physically possible in terms of signs the hand can comfortably make while holding a device. They are grouped by active finger, highlighted with a hatched background. Eight signs have one active finger and two several.

Basic Signs

| | Mode | | Contact Patches | | | | | |
|---|---|---|---|---|---|---|---|---|
| No | Command | Data | 80B | 82B | 84B | 86B | 70A | 72A |
| 1 | Intentionally left blank | " | ⦿ | ○ | ○ | ○ | ○ | ○ |
| 2 | " | " | ▯ | ○ | ○ | ○ | ○ | ○ |
| 3 | " | " | ⇧ | ○ | ○ | ○ | ○ | ○ |
| 14 | " | " | ⦿ | ⦿ | ○ | ○ | ○ | ○ |
| 4 | " | " | ○ | ⦿ | ○ | ○ | ○ | ○ |
| 5 | " | " | ○ | ○ | ⦿ | ○ | ○ | ○ |
| 6 | " | " | ○ | ○ | ○ | ⦿ | ○ | ○ |
| 7 | " | " | ○ | ○ | ○ | ○ | ⦿ | ○ |
| 8 | " | " | ○ | ○ | ○ | ○ | ▯ | ○ |
| 13 | " | " | ⦿ | ⦿ | ⦿ | ⦿ | ⦿ | ○ |
| | | | Index | Middle | Ring | Little | Thumb | Base |

▯○ at rest
⦿ pressing
▯ scrolling
⇖ pointing

The significance of being able to identify the finger making a given contact patch can best be illustrated by the example of pressing with a finger, shown in the table as ⦿ All fingers can perform this action, even when holding a device. By itself the contact patch made by a finger that has been pressed cannot be told apart from that made by another finger (that has been pressed). However, because its identity can be determined from the context of the other fingers, pressing adds seven signs to the basic set, not just one; namely signs 1, 4, 5, 6 and 7, with one active finger, and signs 13 and 14 with several. A gesture based interface cannot tell the fingers apart.

Scrolling, which is shown in the table as □, is the movement a finger makes to turn a scroll wheel. This movement, which may be repeated, is easy for the thumb 70 and the index finger 80 but not the other fingers (albeit not completely impossible). When holding the device to use it, the user's thumb is normally in a vertical orientation and the index finger in a horizontal orientation. In view of this, it is more intuitive (but not necessary) to associate an up and down movement with scrolling with the thumb (sign 8) and a lateral movement (panning), with scrolling with the index finger (sign 2). Since two different fingers can perform this movement, scrolling adds two distinct signs to the basic set, signs 2 and 8.

With the device held in a handshake-like grip, the user's index finger 80 still enjoys significant freedom of movement; the device is secured between the thumb 70 and the base of the thumb 72 on one side and the other three fingers on the other. This enables the user to trace a path typically on the sensor region on the back of the device using the index finger 80 as a pointer. This movement, called pointing, shown in the table as ⇖, is the same movement the user makes with the index finger on a touchpad. It can be used to control the position of a cursor on a display (typically on the front of the device). At the limits of its reach, the user can reposition the index finger to continue the movement from a new position, as one does on a touchpad. This movement is especially suited to inputting multi-dimensional or continuous data, such as marking a point on a map. Only the index finger 70 can point with ease, therefore pointing contributes only one sign (sign 3) to the basic set.

Applications

The following three examples will serve to illustrate (i) that the basic signs introduced above enable the user to operate handheld electronic devices by means of the tactile interface of the invention and (ii) that the user can do so in a straightforward and intuitively satisfactory manner. The examples will show how, in addition to entering commands, the interface of the invention makes it possible to enter data (for example, numbers and text) and to navigate menu structures. The examples will also demonstrate that the finger movements the interface of the invention relies on can be employed without modification to operate devices of different types and a variety of shapes and sizes.

In order of presentation, the examples consist of a generic TV remote control, a generic GPS navigation device and a generic smartphone. The solutions presented address the key functional requirements of these devices in some detail; they are not comprehensive product designs, though. Nor are they the only solutions imaginable for these devices within the scope of the invention. Nor are the devices illustrated the only devices to which the invention applies. They just show some of the possibilities the invention makes available for the in-hand operation of handheld electronic devices. Other embodiments of the invention are mentioned throughout this specification including but not limited to a remote control for the windows of a car integrated into the steering wheel or a remote control for an entertainment system built into the armrest of a passenger seat or wheelchair controls integrated into the armrest.

In the discussion that follows the focus will be on what the user does with the active finger or fingers to make a sign, because this is what the user is conscious of when operating a handheld electronic device with the interface of the invention. What happens with the other fingers (and the base of the thumb), while essential for determining which finger produced each of the contact patches constituting the sign, escapes the user's conscious attention.

TV Remote Control

Figure 4:
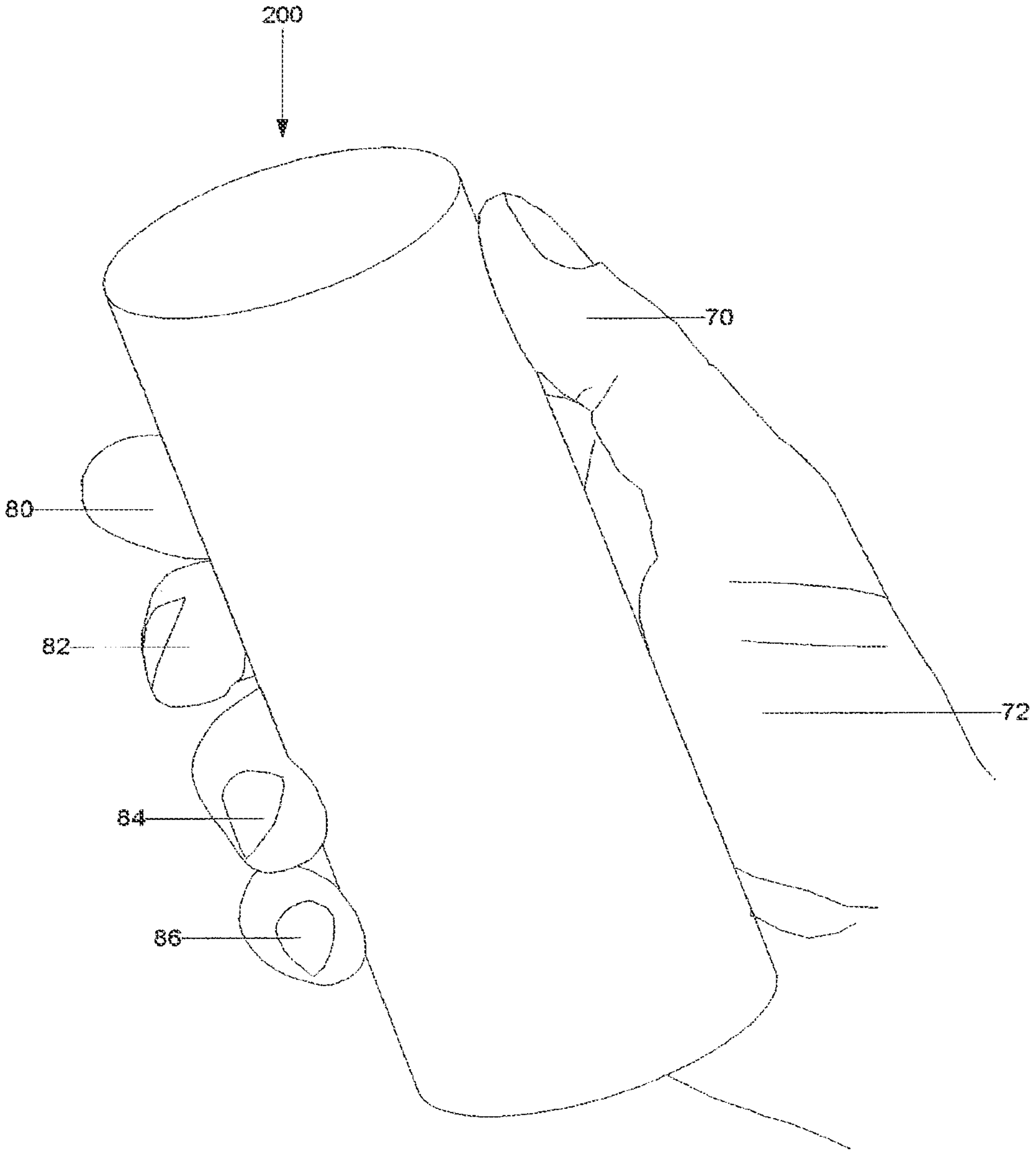
FIG. 4 is a perspective view of a cylinder-shaped TV remote control held in the right hand.
Figure 5:
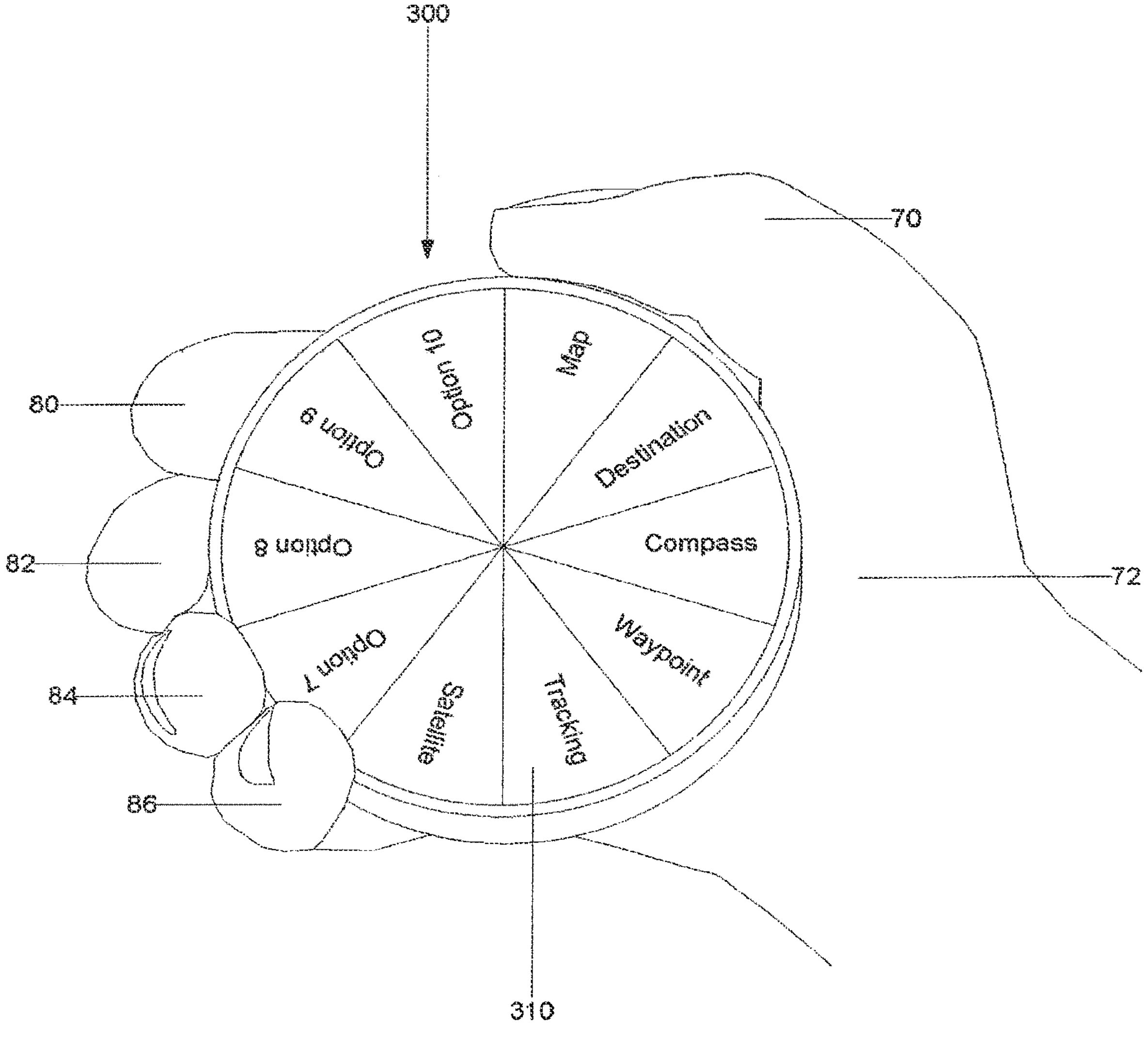
FIG. 5 shows a disk-shaped GPS navigation device held in the right hand; its display shows a menu in the form of segments of a wheel.

FIG. 4 shows a perspective view of a basic TV remote control 200 embodying the interface of the invention, held in the hand of a user. It is in the form of a cylinder and has no display. Like the typical TV remote control, it uses the display of the TV set. In view of its shape, the device has no front or back. Its interface encompasses its entire lateral surface. This means the user can operate the device while holding it anywhere around its stock. The table below illustrates one way to make use of the basic sips in this application. When the user makes these signs the remote control device transmits the corresponding control signals to the TV set. To help the user make the right sign, the TV set can be made to show prompts indicating what the active finger or fingers need to do.

Basic Signs used with TV Remote Control

| | Mode | | Contact Patches | | | | | |
|---|---|---|---|---|---|---|---|---|
| No | Command | Data | 80B | 82B | 84B | 86B | 70A | 72A |
| 1 | mute/unmute toggle | 1 | ⦿ | ○ | ○ | ○ | ○ | ○ |
| 2 | volume up/down | | ▯ | ○ | ○ | ○ | ○ | ○ |
| 14 | enter | | ⦿ | ⦿ | ○ | ○ | ○ | ○ |
| 4 | additional function 1 | 2 | ○ | ⦿ | ○ | ○ | ○ | ○ |
| 5 | additional function 2 | 3 | ○ | ○ | ⦿ | ○ | ○ | ○ |
| 6 | additional function 3 | 4 | ○ | ○ | ○ | ⦿ | ○ | ○ |
| 7 | switch to data mode | 5 | ○ | ○ | ○ | ○ | ⦿ | ○ |

-continued

Basic Signs used with TV Remote Control

| | Mode | | Contact Patches | | | | | |
|---|---|---|---|---|---|---|---|---|
| No | Command | Data | 80B | 82B | 84B | 86B | 70A | 72A |
| 8 | channel up/down | | ○ | ○ | ○ | ○ | ▯ | ○ |
| 13 | on/off toggle | 0 | ⦿ | ⦿ | ⦿ | ⦿ | ⦿ | ○ |
| | | | Index | Middle | Ring | Little | Thumb | Base |

Pressing all fingers (i.e. making sign 13) and holding the sign for a moment turns the TV set on or off.

Scrolling with the index finger (making sign 2) raises and lowers the volume; pressing with the index finger (sign 1) mutes and un-mutes the sound.

The user can select a channel in two ways. The default is by scrolling with the thumb (making sign 8) to increment or decrement the channel number. The faster the user scrolls the faster the channel numbers change. When the user stops, the remote control switches the TV set to the channel selected. Alternatively, the user can enter a channel number directly. This requires additional signs. By configuring the device so it can switch between command and data mode, it is possible to reuse signs used to control functions when in command mode for numbers, while keeping the overall number of distinct signs down. With this in mind, a coherent set of number signs is obtained by attributing a unique numeric value to each finger: in particular 1 for the index finger 80, 2 for the middle finger 82, 3 for the ring finger 84, 4 for the little finger 86 and 5 for the thumb 70 (as shown in the table above). In data mode—entered, say, by pressing with the thumb (making sign 7) —pressing a finger, i.e. making the sign consisting of pressing a given finger, adds its value to a register and moves the entry point to the next position. For 1 to 5 the user just presses the corresponding finger. For 6 to 9 the user has to press two fingers together to add the sum of their values to the register. For 0 the user presses all fingers at once (sign 13); this will only shut the TV set down if the sign is sustained.

The following table shows all number signs together. Signs 1, 4, 5, 6 and 7 with a single active finger are part of the basic set. In command mode they control the functions of the remote control device; in data mode they represent numbers.

Number Signs

| | Mode | | Contact Patches | | | | | |
|---|---|---|---|---|---|---|---|---|
| No | Command | Data | 80B | 82B | 84B | 86B | 70A | 72A |
| 1 | | 1 | ⦿ | ○ | ○ | ○ | ○ | ○ |
| 4 | | 2 | ○ | ⦿ | ○ | ○ | ○ | ○ |
| 5 | | 3 | ○ | ○ | ⦿ | ○ | ○ | ○ |
| 6 | | 4 | ○ | ○ | ○ | ⦿ | ○ | ○ |
| 7 | | 5 | ○ | ○ | ○ | ○ | ⦿ | ○ |
| 9 | | 6 | ⦿ | ○ | ○ | ○ | ⦿ | ○ |
| 10 | | 7 | ○ | ⦿ | ○ | ○ | ⦿ | ○ |
| 11 | | 8 | ○ | ○ | ⦿ | ○ | ⦿ | ○ |
| 12 | | 9 | ○ | ○ | ○ | ⦿ | ⦿ | ○ |
| 13 | | 0 | ⦿ | ⦿ | ⦿ | ⦿ | ⦿ | ○ |
| | | | Index | Middle | Ring | Little | Thumb | Base |

These signs mirror the way numbers are represented on a soroban abacus, where 6 to 9 are rendered as a combination of one to four beads of value 1 and the bead of value 5. They are also similar to the signs used in American Sign language (ASL) to sign numbers with one hand. The difference is that for 1 to 5 ASL actually shows the corresponding number of fingers while the finger combinations for 6 to 9 are the same but used in reverse order, i.e. the ASL sign for 9 corresponds to the sign for 6 etc. The sign for 0 is the same. The point of this is to say, the method is learnable.

Figure 4A:
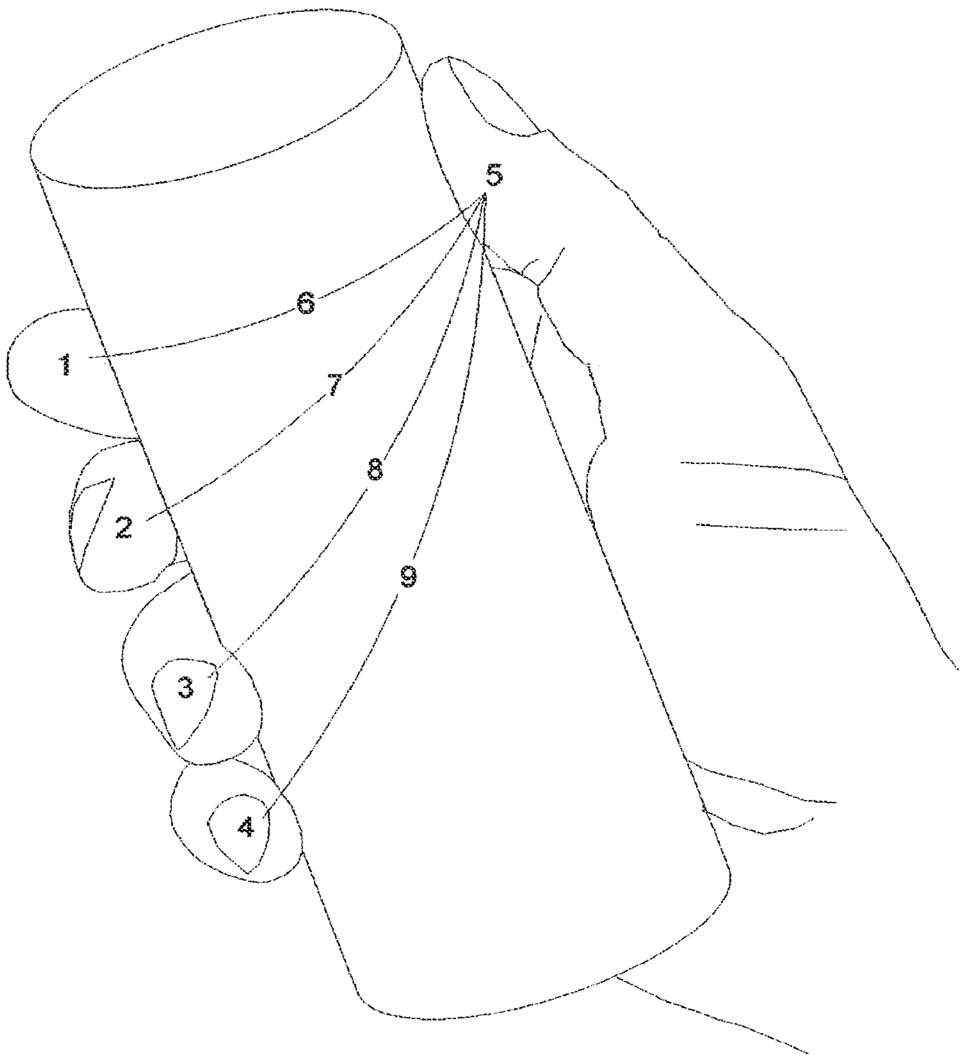
FIG. 4A is a visualization of the fingerings for the numbers superimposed on FIG. 4.

FIG. 4A shows a simple and intuitive way to visualize the fingerings for the numbers. Each finger is labelled with the numeric value attached to it. The lines connecting the finger pairs show the sum of their values, i.e. the number sign obtained when both are pressed together. To help the user, the display can show FIG. 4A when the device is in data mode and the user is entering numbers.

Continuing to speak in terms of what the user does with the active finger to make a sign, for numbers of more than one digit the user proceeds in the conventional way, from high to low, one digit at a time. To enter 51, for instance, the user presses the thumb first (sign 7) to enter 5 and then the index finger (sign 1) to enter 1. When the user has entered a complete channel number, the remote control switches the TV set to that channel. For channel numbers with less than the maximum number of digits, the user can press the index and middle fingers together (sign 14) (or pad the channel number with leading zeros) to switch to the channel. Failing that, the interface will switch the TV set to the channel entered after an interval, if no additional digits are entered.

GPS Navigation Device

FIG. 5 shows a perspective view of a generic handheld GPS navigation device 300 held in the hand of a user. The device and its display 310 are round. The following table shows one way to make use of the basic signs to operate a handheld GPS in combination with the number signs and the possibility of switching between command and data mode introduced above. Unlike the TV remote control, the GPS is a stand-alone device.

Basic Signs used with GPS navigation device

| | Mode | | Contact Patches | | | | | |
|---|---|---|---|---|---|---|---|---|
| No | Command | Data | 80B | 82B | 84B | 86B | 70A | 72A |
| 1 | toggle direct/crosshair | 1 | ⦿ | ○ | ○ | ○ | ○ | ○ |
| 2 | | adjust longitude | ▯ | ○ | ○ | ○ | ○ | ○ |
| 3 | | move pointer | ⇧ | ○ | ○ | ○ | ○ | ○ |
| 14 | ENTER | | ⦿ | ⦿ | ○ | ○ | ○ | ○ |
| 4 | | 2 | ○ | ⦿ | ○ | ○ | ○ | ○ |
| 5 | | 3 | ○ | ○ | ⦿ | ○ | ○ | ○ |
| 6 | | 4 | ○ | ○ | ○ | ⦿ | ○ | ○ |
| 7 | direct/incremental entry | 5 | ○ | ○ | ○ | ○ | ⦿ | ○ |
| 8 | rotate menu | zoom, adjust latitude | ○ | ○ | ○ | ○ | ▯ | ○ |
| 13 | on/off toggle | 0 | ⦿ | ⦿ | ⦿ | ⦿ | ⦿ | ○ |
| | | | Index | Middle | Ring | Little | Thumb | Base |

Pressing with all fingers (making sip 13) and holding the sign will switch the GPS on and show a menu of actions the user can select from. Taking a lead from the round display, the choices of the menu are shown as the segments of a wheel, as illustrated in FIG. 5. (Opting for this format, which is reminiscent of a traditional engine order telegraph, is a choice, not a consequence of the shape of the display.) Scrolling with the thumb (sign 8) turns the wheel. When the segment with the desired option is where the index finger 80 touches the edge of the device, the user can press the index finger (sign 1), to select it. Likewise for any other suitable mark.

Figure 5A:
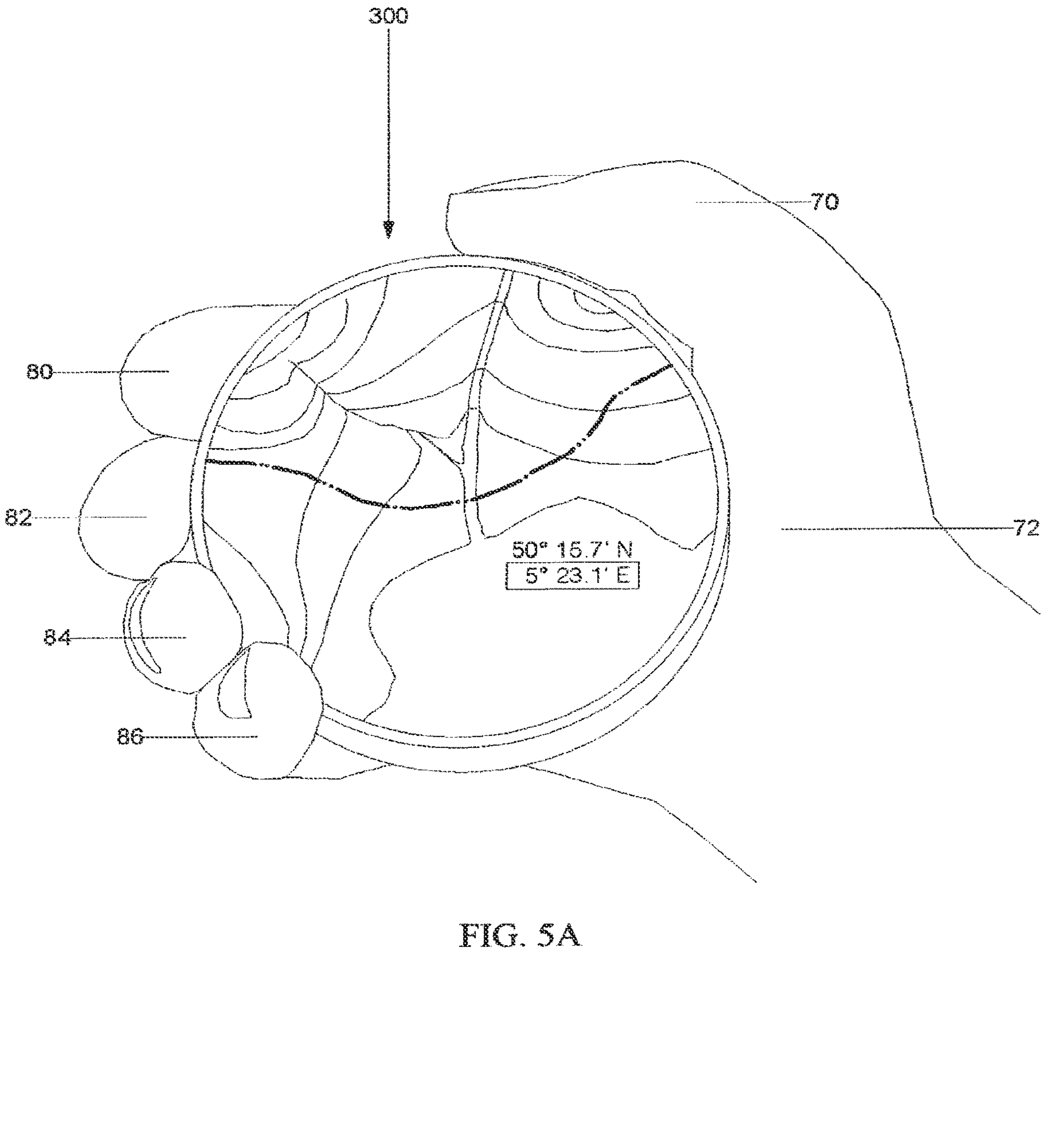
FIG. 5A shows the device of FIG. 5 held in a handshake like grip in the right hand; its display shows a map with the coordinates of the current pointer position superimposed on it.

A basic function the user of a GPS has occasion to perform often is to enter the geographic coordinates of a location, for example as a waypoint. There are two ways to go about this. When the user selects the corresponding option, the display will switch the device to data mode and show a map centered on the current position with the coordinates of the position superimposed on the map, as illustrated in FIG. 5A. To enter a new position the user moves the pointer with the index finger (making sign 3). To facilitate placing the pointer, the user can zoom in and out of the map, by scrolling with the thumb (sign 8). As the pointer moves the geographical coordinates shown in the display track its location on the map. Once the pointer is in the correct position, the user presses the index and middle fingers together (sign 14) and holds the sign to select it. This loads a new menu of options, similar to the one in FIG. 5, from which the user can chose the next step.

An alternative is to enter numeric values for the coordinates directly. Selecting this option from the menu in FIG. 5 switches the interface to data mode and the device interprets the signs the user makes as numbers adding their values to a register, as already described. A pragmatic way to enter coordinates by this method is to enter them in round figures and then to fine-tune them by scrolling. To toggle between longitude and latitude, the user presses the index and middle fingers together (making sign 14). Scrolling with the thumb (sign 8) adjusts the degrees and with the index finger (sign 2) the minutes and decimals of minutes. (Industry practice is to display decimals of minutes instead of seconds.) Scrolling increments or decrements the value, slower or faster depending on the speed of the scroll. To record a coordinate the user presses the index and middle fingers together (sign 14) and holds the sign, as before. This displays a menu, like the one in FIG. 5, from which the user can select the next step.

Smartphone

Figure 6:
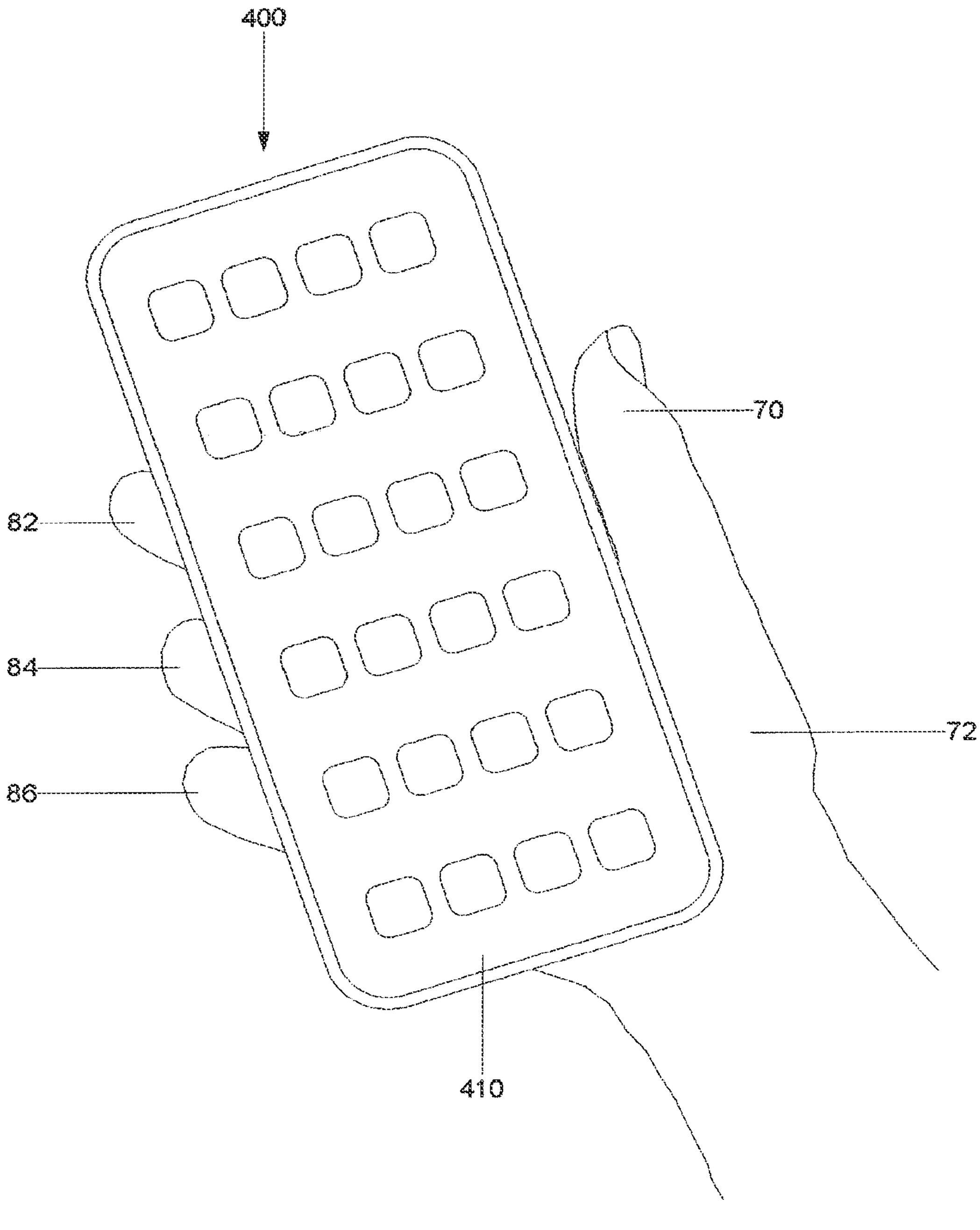
FIG. 6 shows a perspective view of a generic smartphone showing a home screen held in a handshake like grip in the right hand; the index finger is not visible at the back of the device.

FIG. 6 shows a typical smartphone 400 with a display 410 held in the hand of a user. Like the GPS, it is a stand-alone device. The following table illustrates one way to use the basic sips to operate the principal functions of a smartphone in-hand:

| Basic Signs used with Smartphone | | | | | | | | |
|---|---|---|---|---|---|---|---|---|
| | Mode | | Contact Patches | | | | | |
| No | Command | Data | 80B | 82B | 84B | 86B | 70A | 72A |
| 1 | select row 2 | 1 | ⦿ | ○ | ○ | ○ | ○ | ○ |
| 2 | panning left/right | move cursor left/right | ▯ | ○ | ○ | ○ | ○ | ○ |
| 3 | move pointer | | ⇧ | ○ | ○ | ○ | ○ | ○ |
| 14 | ENTER | | ⦿ | ⦿ | ○ | ○ | ○ | ○ |
| 4 | select row 3 | 2 | ○ | ⦿ | ○ | ○ | ○ | ○ |
| 5 | select row 4 | 3 | ○ | ○ | ⦿ | ○ | ○ | ○ |
| 6 | select row 5 | 4 | ○ | ○ | ○ | ⦿ | ○ | ○ |
| 7 | select row 6 | 5 | ○ | ○ | ○ | ○ | ⦿ | ○ |
| 8 | scrolling up/down | move cursor up/down | ○ | ○ | ○ | ○ | ▯ | ○ |
| 13 | select row 6 | 0 | ⦿ | ⦿ | ⦿ | ⦿ | ⦿ | ○ |
| | | | Index | Middle | Ring | Little | Thumb | Base |

Navigating the Home Screen

Figure 6A:
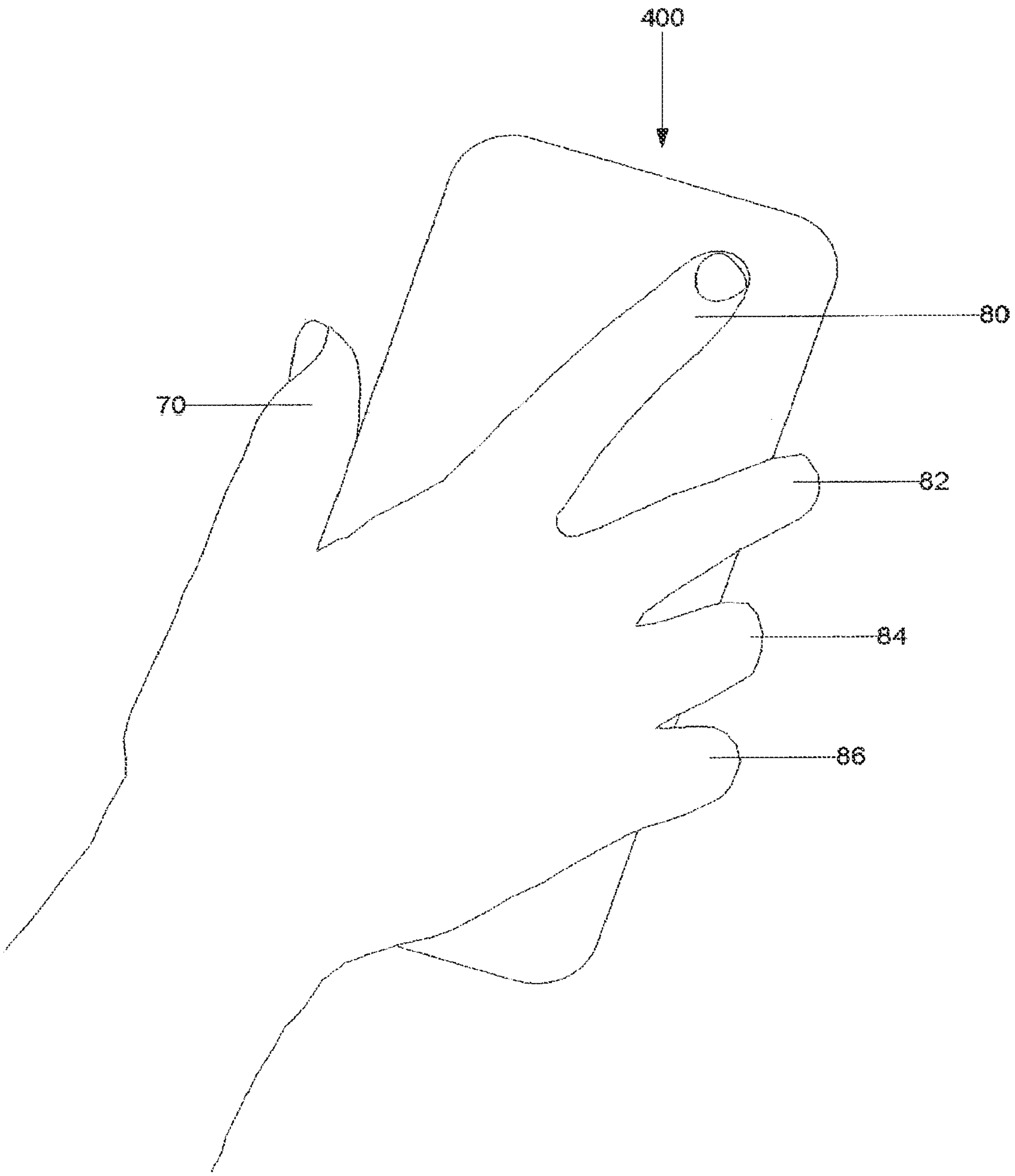
FIG. 6A shows a perspective view of the device of FIG. 6 seen from the back with the index finger in contact with the rear surface.

Pressing all fingers (making sign 13) and holding the sign switches the device on; when first switched on, its display typically shows a home screen like the one illustrated in FIG. 6. In this instance, it has six rows and four columns. The sixth row is the dock. The user can select and launch any item on the home screen directly using the index finger 80 to point at it with the cursor (sign 3) and launch it by pressing (sign 1). Inasmuch the user makes these signs on the back of the device, as shown in FIG. 6A, this does not mask any part of the display.

Notice that pressing with the index finger yields sign 1 regardless of whether the user presses the interface on the sides of the device as in the two previous examples or on the back as here.

An alternative method for selecting an item, known as item scanning, relies on auto-scanning, an accessibility feature many current computer operating systems support. Here the user makes a sign, sign 14 say, to start the focus cycling automatically, first through rows and after the user has selected one (by making the same sign again) through the items (entries) of the row until the user selects one of the entries by making the sign one more time when the focus is on the desired item. This ends the scan and launches the item.

While this specification describes using the interface of the invention with all five fingers, it can be adapted for persons of limited dexterity. Even a user who only has the use of one finger can navigate a device equipped with the interface of the invention using item scanning.

A user can also select an item not presented in a structured form by means of item scanning. In this case the focus scans all items sequentially until the user stops the scan. For content that is completely unstructured the user can select an item by pointing at it, i.e. by moving a pointer with the index finger (sign 3) or by point scanning (signs 2 and 8) and pressing the index and middle fingers together (sign 13) to launch the desired item.

To bring an item that is not visible in the display into view, the user can scroll. To shift the array sideways the user scrolls with the index finger (sign 2); to shift it vertically with the thumb (sign 8). Depending on the speed of the scroll the additional items will come into view more slowly or faster. Where it makes sense, scrolling can be configured to be in increments of complete screen loads, rather than progressive.

As long as there are no more than five choices, each can be mapped to a finger directly, no matter where it appears on the display. There are many ways to signify the mapping. An obvious way is with a line from the icon that stands for a choice to the place where the finger controlling it touches the edge of the display. Or, by means of a chasing light effect pointing at the finger controlling the selection or another animation. For the visually impaired the interface can be configured to make the connection by rendering the contents of a row in spoken form when the user presses the corresponding finger (and delaying the execution of the selection to give the user time to reject it by lifting the finger). In addition the interface could give feedback when the finger is pressed by lighting up the choice selected and making a click sound or heating the contact patches when it is executed.

Phone

One use of a smartphone is obviously to make a phone call. After selecting the phone app on the home screen, the user scrolls through a list of contacts (sign 8) and selects the number he wants to call. To dial the call the user presses the index and middle fingers together (sign 14). To end the call the user makes sign 14 again. To add a number to the list the user uses the number signs introduced above. When the number is complete, the user presses the index and middle fingers together (sign 14) to save it. For how to add a name see below.

To correct an erroneous entry the user can backspace by pressing and holding all fingers at once (sign 13). On the other hand, there is no a priori reason why all functional interactions with the interface have to be in the form of signs. For instance, the app can be configured so that shaking the device erases the contents of the current register allowing the user to start afresh.

Text Editor

Another use of smartphones is to produce text, e.g. for e-mails or text messages or to add a name to a contact list or to conduct a search or to open a URL. To compose text, the user launches the text editor app from the home screen. This may bring a six by six matrix like the one shown in FIG. 6B into the display and switch the device to data mode. The matrix is populated with the letters of the alphabet, plus some punctuation marks and special characters. To compose a text the user chooses letters (and other characters) from the matrix by first selecting the row an item is on and then, in a second step, the item itself. The signs for this are quite simple. To select a row, the user presses a finger. For the top row it is the thumb (sign 7), for the second row it is the index finger (sign 1) and so on (as indicated in the table above).

To signify the row a finger selects, in the present illustration, the first five rows are displayed level with the corresponding finger. On top of that, each row has an outline in the shape of a directional sign indicating the direction the user must press the corresponding finger to select the row. The outline of the sixth row, which is not aliped with any finger, is blunt at both ends. To select it, the user presses all fingers at once (sign 13). Selecting a row with several entries causes the interface to execute a routine that transposes it into a column: Entry 1 becomes the first row (of the column), Entry 2 the second row and so on. To choose a row the user employs the same signs as before, only this time each row represents a single character; there are no further choices. In that case, selecting a row adds the character it represents to the input string and starts another iteration.

Figure 6B:
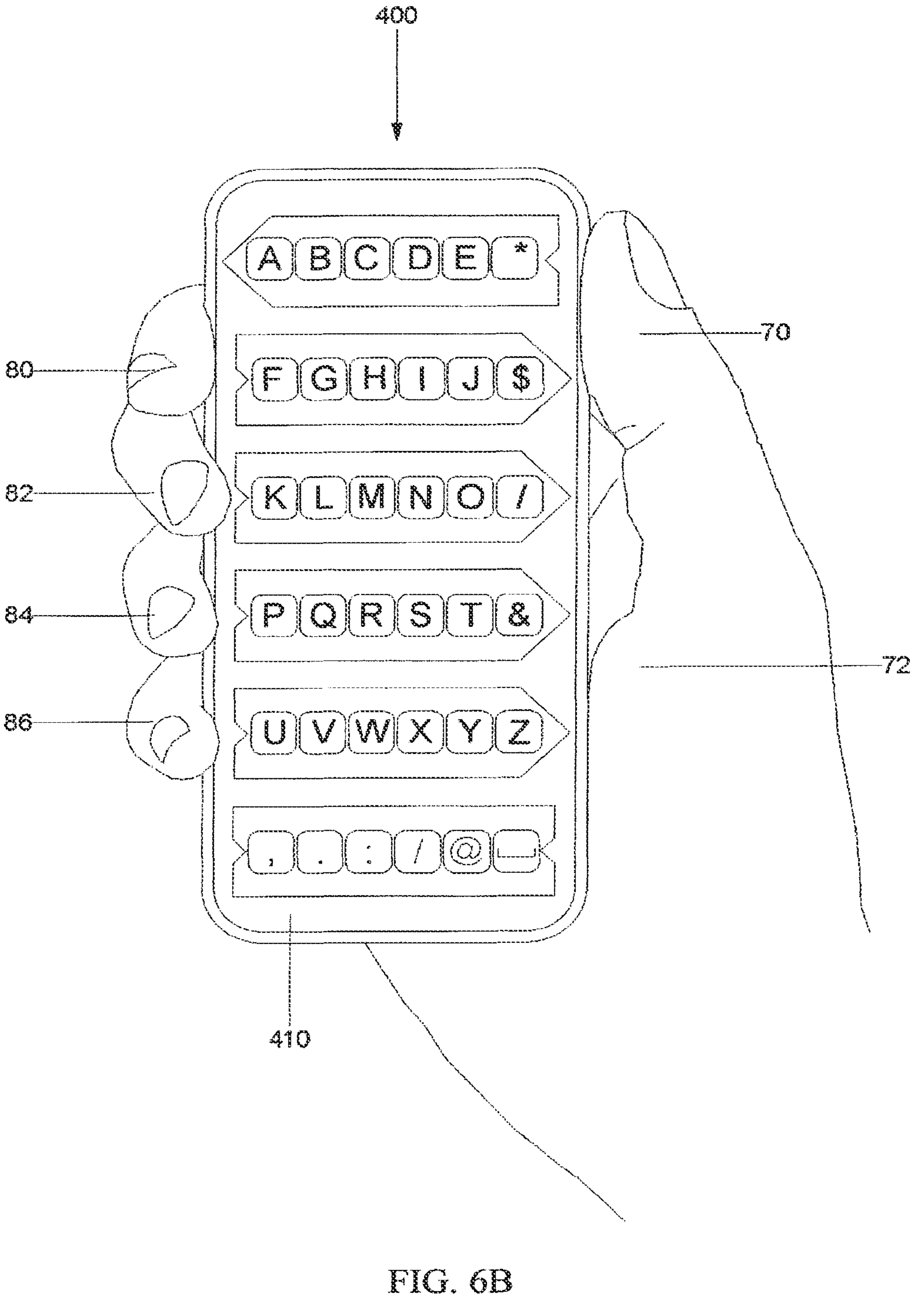
FIG. 6B shows a perspective view of a generic smartphone held in a handshake like grip in the right hand; its display shows a 6×6 matrix with the alphabet, punctuation marks and special characters.
Figure 6B:
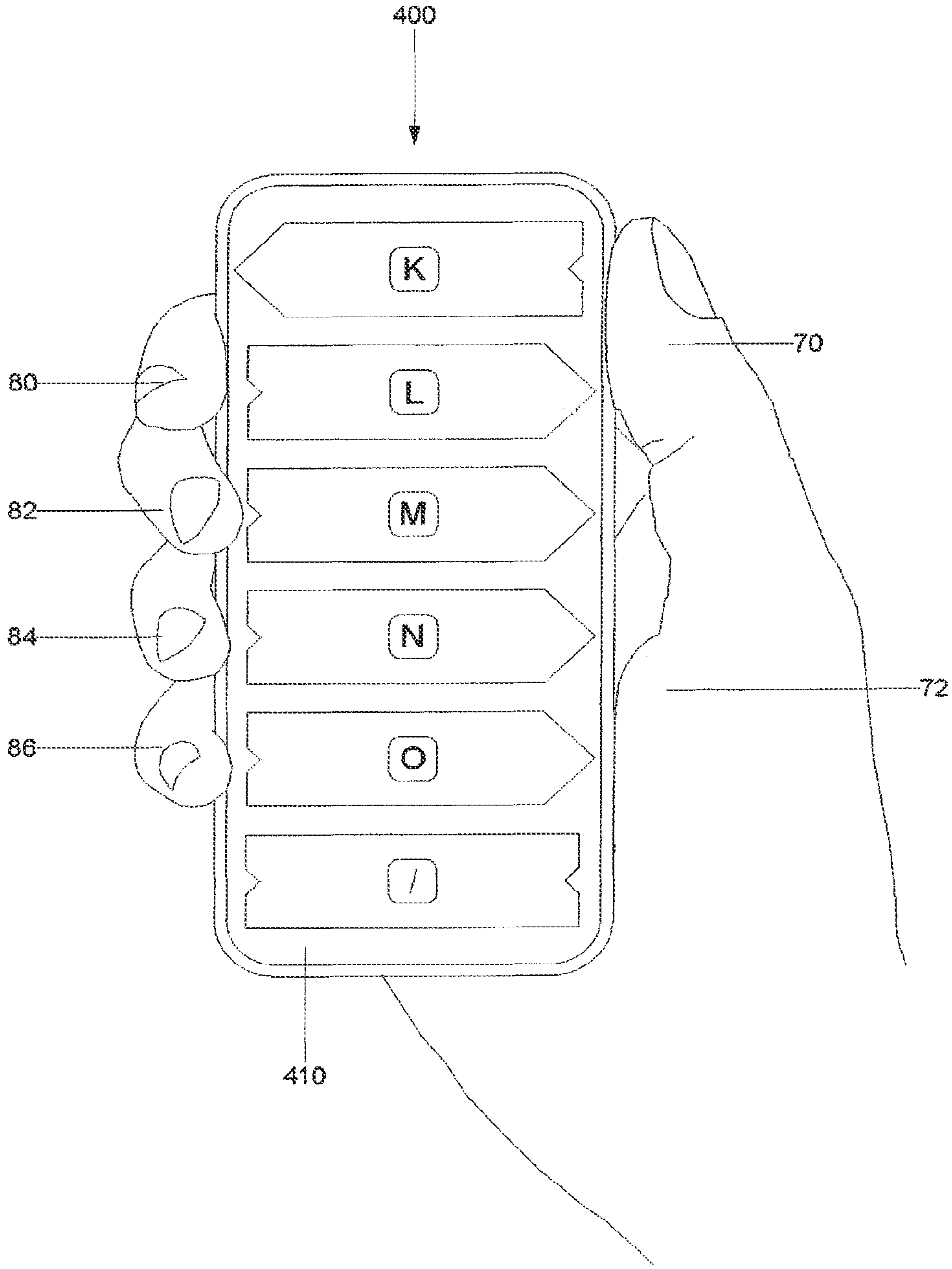

To produce the letter N, to give a concrete example, the user first selects the row containing the letter, i.e. the third row of FIG. 6B, by pressing the middle finger (sign 4), because N is on that row (which is next to the middle finger 82). This transposes the third row into a column, one entry to a row and refreshes the display to show FIG. 6B'. Now the user selects the letter N by pressing the ring finger (sign 5), because that is the row on which N now is. This adds the letter N to the input string and reverts to the first screen. And so on.

To add a full stop to the input string, the user presses all fingers together (sign 13), because the full stop is on the sixth row of FIG. 6B, which is selected with sign 13. This transposes the sixth row and refreshes the display to show its entries in a column, one to a row as shown in FIG. 6B". At this point, pressing the index finger (sign 1) selects the full stop, now on the second row, and adds it to the input string. It should be apparent, that the iterative method for selecting letters and special characters to produce a text can be applied to any choice presented in matrix form, the home screen in particular. Depending on the items a matrix contains, selecting one may open a document, an image for instance, or start executing a program or shut down the device, to give a few examples.

To permit the user to see what he is typing the matrix of input characters shown in FIG. 6B can be made translucent. Or, an area of the display can be set aside for the input string.

To correct an error the text editor can be configured so that pressing and holding all fingers at once (sign 13) backspaces until the user lifts the sign. (In data mode sign 13 does not shut the device down.) Alternatively, the app could be configured so that guided by an animation suggestive of pouring away a liquid, the user can tilt the device to pour away characters one at a time, starting at the insertion point and continuing until the user stops tilting the device.

The user can move the insertion point by pointing (sign 3).

The text editor can be configured so that holding down the finger by which the user has selected a letter toggles to the upper case form of the letter. Or so that, when a letter has variants with diacritical marks like an accent, an umlaut, a cedilla, or a tilde, then holding down the finger cycles through the choices until the user lifts it, adding the item in focus to the input string.

For additional characters, the Greek alphabet say, the device can be configured so that the user can swap the current character set for another by scrolling with the thumb (sign 8) or the index finger (sign 2) and then select characters in the usual way. This is a ease where the increment of the scroll should be a complete character set; having a melange of different character sets to choose from would not make sense.

Figure 6C:
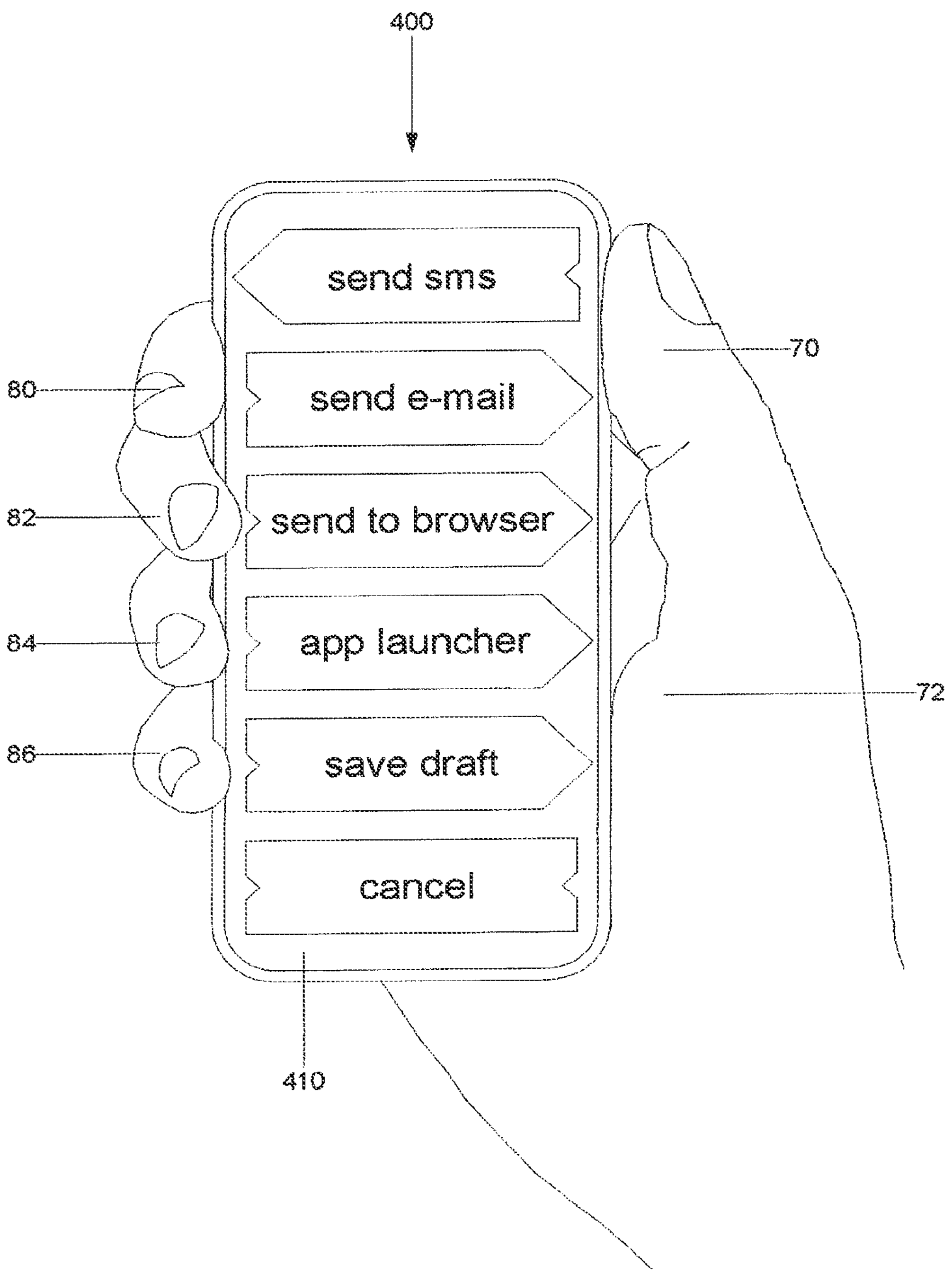
FIG. 6C shows a perspective view of a generic smartphone held in a handshake like grip in the right hand with a menu of steps the text editor application makes available when closing it.

Pressing with the index and middle fingers together (sign 14) exits the text editor and presents a menu of choices of what to do with the text. An illustrative example with options to (i) send the text as an SMS or to (ii) enter an e-mail address (prior to sending it), to send it to (iii) a browser or to (iv) an application launcher, to (v) save it or to (vi) cancel it (with a subsequent choice to save or delete it) is given in FIG. 6C.

Calculator

Figure 6D:
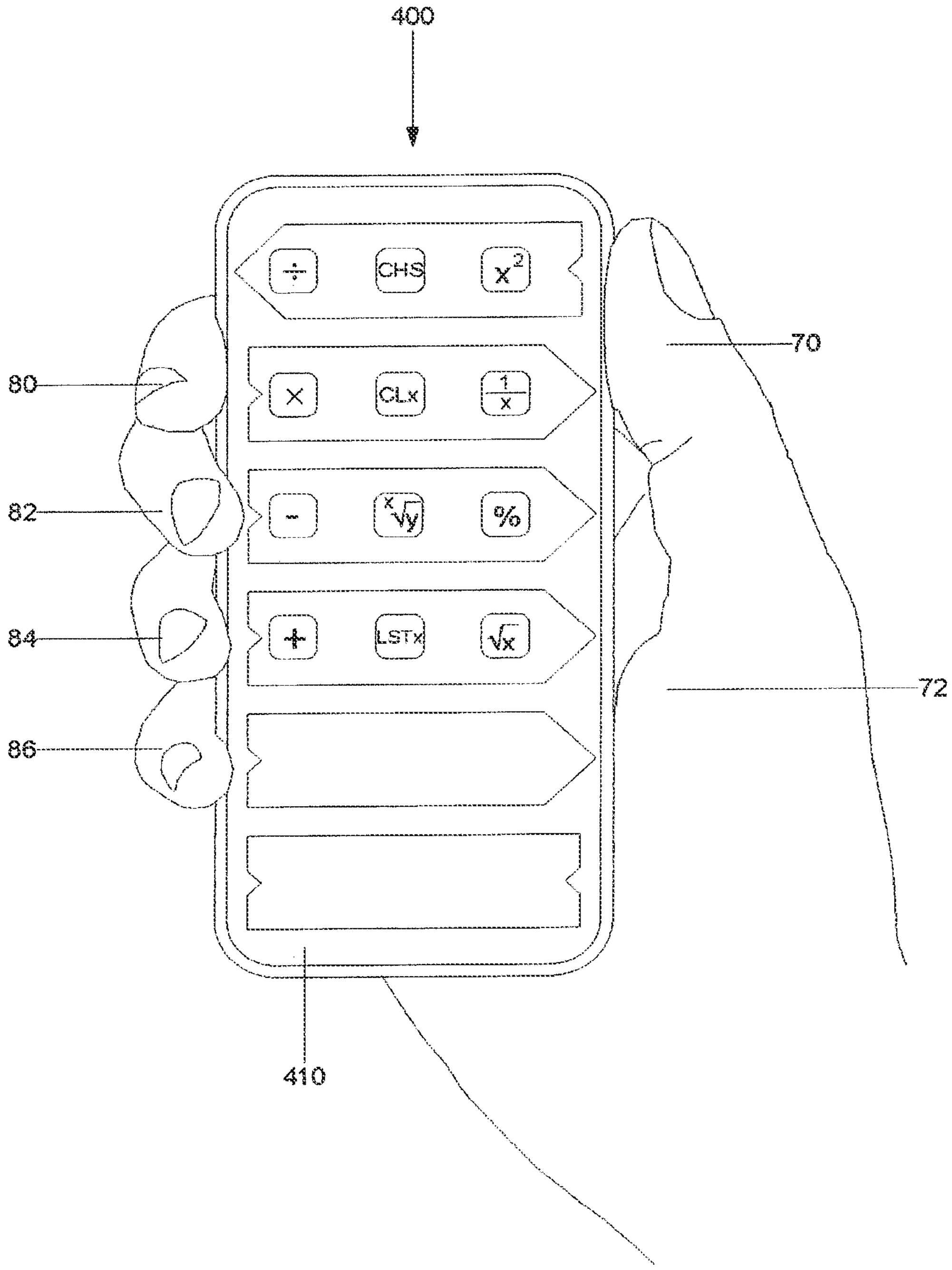
FIG. 6D shows a perspective view of a generic smartphone in a handshake like grip in the right hand with a menu of possible steps the calculator application makes available after entering an operand.
Figure 6D:
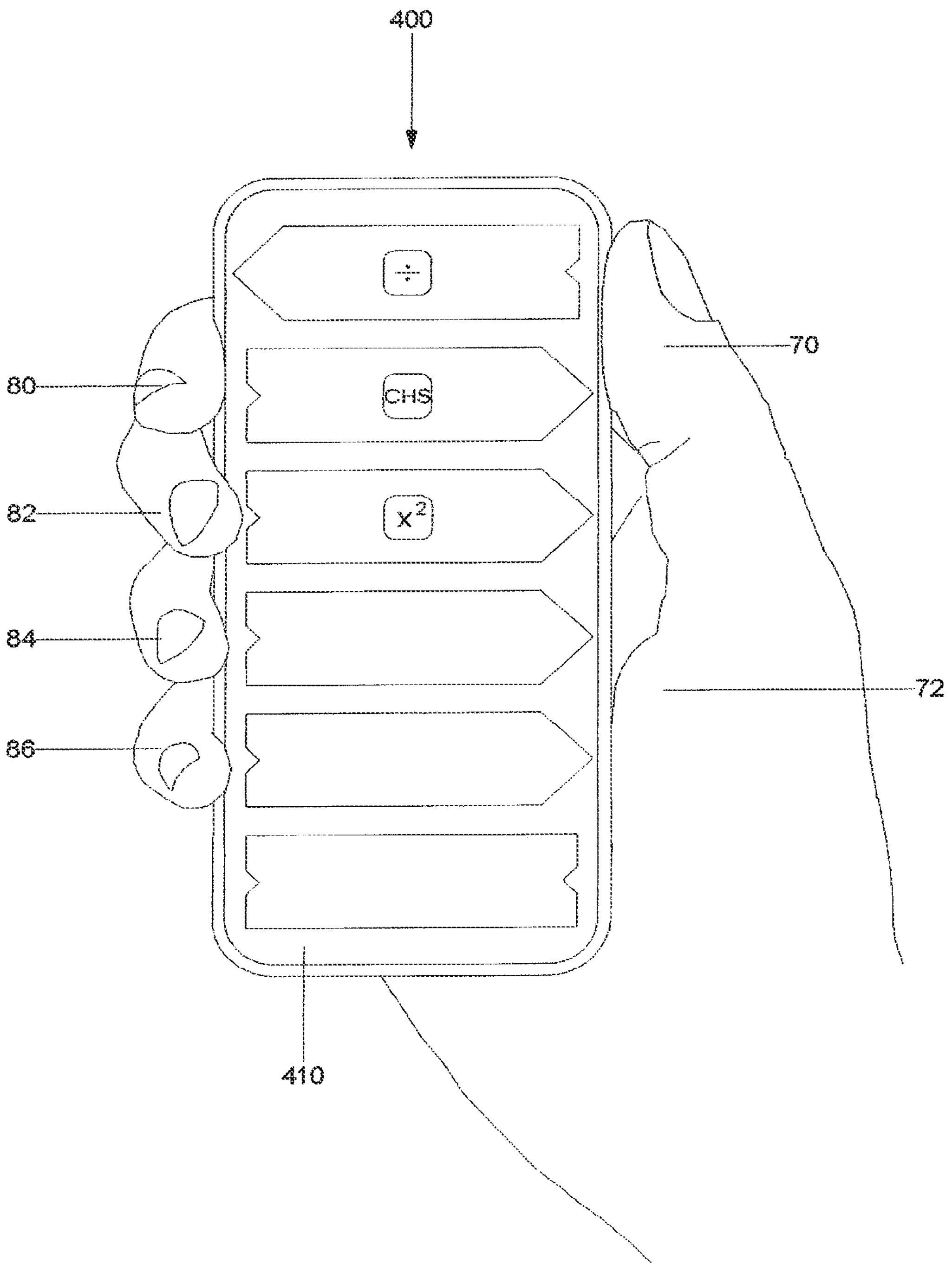

Another application usually found on smartphones is a calculator. The calculator app can be implemented with reverse Polish (RPN) or algebraic notation. Having launched the app on the home screen, in RPN the user first enters an operand using the method for entering numbers described above and then presses the index and middle fingers together (sign 14) to record it and raise the stack. The display then shows a menu like the one in FIG. 6D with possible next steps, including various calculations. From these the user can select an appropriate one by pointing at it (sign 3) and launching it (sign 1). The user can also use the iterative method introduced above. To execute the change sign function (CHS), for instance, the user first presses the thumb (sign 7) to select the first row of FIG. 6D, on which CHS is. This transposes its entries into a column as shown in FIG. 6D'. Now the user presses the index finger (sign 1) to select CHS, which is on the second row of FIG. 6D'. This changes the sign of the operand and returns the result to the display. Now the user can type another operand and press the index and middle fingers again (sign 14); this will display the menu shown in FIG. 6D again, from which the user can select the next step.

Dimensions

To permit in-hand operation, a device should be of a size and shape that fits the hand of a human user. In broad terms this means the user should be able to grip the device between the thumb 70 and the base of the thumb 72 and the other fingers. The dimensions given below are of exemplary nature only and are not meant to limit the invention to a particular shape, size, and/or dimension. Moreover, bearing in mind that handheld electronic devices come in many shapes and sizes, it is only possible to give broad examples of the dimensional limits of devices incorporating the present invention.

From side to side a device that incorporates the claimed invention must fit the width of a user's grip between the thumb 70 and the base of the thumb 72 and the other fingers (in a handshake like grip). At the other end of the scale, the device must not be too small to effectively hold and operate. For the side to side dimension of a device embodying the invention—meaning its width or diameter, depending on the shape of the device—approximately 8.5 cm [3" ⅜] and approximately 3.5 cm [1" ⅜] represent reasonable limits. Values outside this range are likely to have usability issues. These are, by the way, the limits within which grip strength is usually measured.

The lateral edges of the display must have room for the index 80, middle 82, ring 84 and little 86 fingers side by side, irrespective of whether they are rectilinear or otherwise. In addition, the lateral edges must allow space for the thumb. Accordingly, they should be equal to or greater than 1.25 times the width of the hand, i.e. the side by side width of the four finger not including the thumb 70. To permit left-handed and right-handed use this must hold for both sides of the device. At the same time this ensures adequate space for the base of the thumb 72. The largest hand width normally found is 120 mm, the maximum width for which gloves are produced commercially. For rectangular devices like the ones in FIGS. 1A and 1B this means that in portrait orientation it should be approximately 150 mm high on each side (with no precise upper limit). For circular devices like the UPS in FIG. 5 it means that the circumference of the device should be at least 300 mm, i.e. two times the maximum width of the hand plus 25% for the thumb.

Where a device makes use of on-screen prompts to indicate the function a finger controls, the proximity of the prompt to the finger underlines the connection. The larger the gap between the fingers gripping the sides of the device and the prompts pointing to the fingers, the greater the notional distance between them and the functions signified by the prompts. In view of this, it is desirable for the surface the fingers arc in contact with and the display to be contiguous or even the same. For instance, the display of a smartphone should ideally cover the entire front of the device without a frame; it may even curve around the edges. In this way the fingers will be adjacent to the display when holding the device in a handshake like grip.

With devices that have distinct edges, i.e. lateral surfaces separate from the front and the hack such as the GPS in FIG. 5 and the smartphone in FIG. 6, the trend is to make them as thin as technically possible. Notwithstanding this, for the purpose of the invention the edges ought to be thick enough for the user to perform the finger movements that control the device on them. For this approximately 6 mm is a reasonable lower limit.

Construction

The structural parts of handheld electronic devices are typically made of a rigid material such as plastic or metal. This is no requirement of the invention, though; for the purposes of the invention the device could be soft.

The surfaces of the device on which the user makes the signs to operate it, usually the sides and back, must be configured with appropriate sensors capable of detecting these signs. The sensors may be internal to the device, in particular embedded in the surfaces of the device the hand is in contact with or external to the device or both. The sensors arc not limited to any specific technology nor to a single technology. Technologies that could potentially be used include RF tracking, capacitive sensing, optical detection, piezoelectric sensing, electromagnetic detection etc. Whatever the technology or the approach the device must be capable of tracking six or more simultaneous contact patches, one for each finger plus one for the base of the thumb 72. Motion is typically detected by means of logic that can tell differences between consecutive steady states, but the invention does not depend on any particular method of motion detection.

The sensitivity of the sensors or sensor system must permit discriminating between the baseline sign and the operational signs. In particular it must tell the contact patch a finger makes while holding the device from the contact patch the same finger makes when actively interacting with its interface on the basis differences in one or more of its distinctive features. For instance it must be capable of detecting that a finger has been pressed based on an increase in the size or the pressure of its contact patch. Or that a finger has moved, as it will to scroll or point, based on differences over time in the location of its contact patch.

In practice the fingers rarely, if ever, interact with the user facing side of the device, which they cannot normally reach when holding it in a handshake like grip. The user facing side of the device is often occupied by a display (but does not have to be), which for the purpose of the invention does not need to be equipped with sensors (but can be).

Tactile user interfaces of conventional design are typically constituted of a flat panel device, particularly gesture based tactile interfaces, i.e. they are planar like control panels. (Sometimes non-functional controls may be found on the edges of a device.) Users access these interfaces from the front only. The user interface of the invention is different. It is situated on several different planes. The plane the user engages with the thumb 70 and the plane he engages with the other fingers face the opposite way. This is because the structure of the interface reflects the anatomy of the hand, in particular the opposability of the thumb. Signs like pointing (sign 3) may involve yet other planes, such as the back of the device. A marked difference between the interface of the invention and conventional interfaces is that it is non-coplanar.

A key design goal of the invention is to permit the user to operate the device in a natural manner, that is by exploiting movements of the hand and fingers that come naturally and do not involve contortions. In support of this goal, the shape of the device may be molded in line with the morphology of the hand. For instance, the back of the device may be rounded.

To afford the user a degree of tactile feedback, the surface of the device can be made with a compressible material, at least where the fingers come into contact with it. This would also protect the device in case it is dropped. The device could also be equipped to provide feedback in other ways. For instance the interface surface could be equipped to give tactile feedback in the manner of a refreshable Braille display or by momentarily heating a contact patch.

Figure 7:
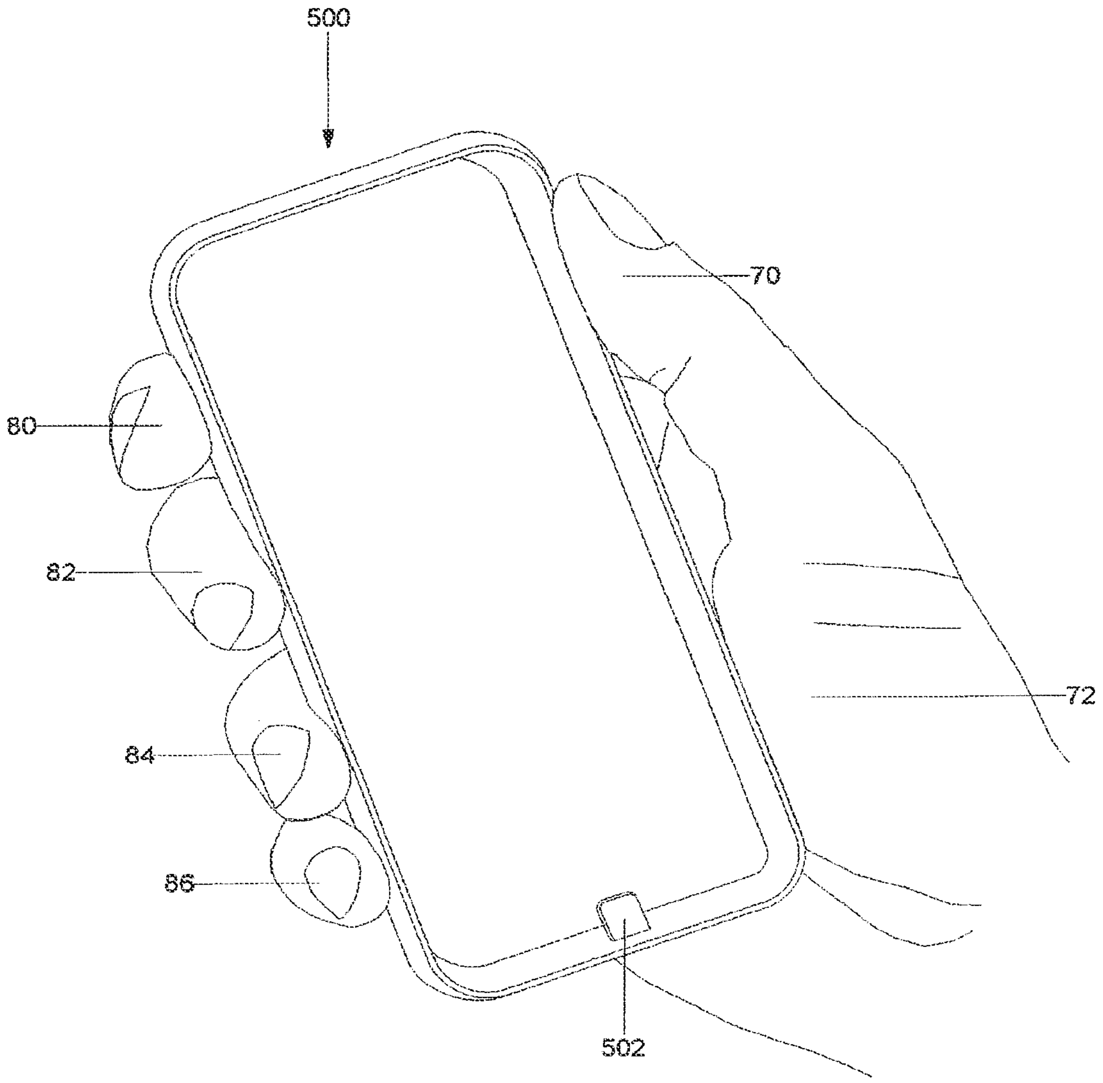
FIG. 7 is a perspective view of an accessory (peripheral) input device in the form of a casing or shell incorporating the interface of the invention into which an associated device can be inserted.

FIGS. 5 and 6 show embodiments of the invention, in which the user interface is integrated with the standalone device it serves to operate. GPSs and smartphones are typical examples of this kind. Alternative embodiments as accessories (peripherals) to other devices are also within the scope of the invention. The remote control in FIG. 4 is a case in point. The functions of such devices are usually limited to controlling another device. FIG. 7 shows yet another embodiment of the invention as an accessory device. It is a peripheral electronic device 500 in the form of a casing or shell incorporating the interface of the invention, into which a second device, which it controls, can be inserted. Provided the device inserted into the shell accepts peripheral input devices and its operating system can process signals from them, this embodiment is capable of adding the functionalities of the interface of the invention to an existing device. The signals from the casing or shell may be transmitted to the device it encloses through a physical connection e.g. the connector 502 in FIG. 7 or a wireless link e.g. Bluetooth, infrared light (or both).

Advantages

The advantages of the present invention include, without limitation:

The present invention is an innovative tactile user interface designed for the in-hand operation of handheld electronic devices of different kinds. It improves the ergonomics of such devices, in particular by enabling users to operate them with all five fingers (of the hand holding the device) in a completely natural manner. It also permits the standardisation of the operational modalities over a broad range of handheld electronic devices of a variety of types, shapes and sizes. At the same time an electronic device embodying the present invention overcomes a number of operational issues inherent in the conventional interface design, e.g. the fat finger problem.

Users operate handheld electronic devices equipped with the tactile user interface of the invention in the way they naturally hold them in-hand. The interface design intentionally foregoes unnatural finger movements, such as those sometimes required to operate conventional interfaces with the thumb. All movements the user is required to make are in line with the fine motor skills of the hand, the fingers in particular. No finger has to make contortions, i.e. movements at the limits of its natural motor capabilities.

The interface of the invention is a full size interface. It does not involve manipulating scaled down elements. The size and pitch of the contact patches (as well as their location) is determined by the user's hands and that for each user. They are a direct function of where the individual user's fingers come into contact with the device when holding it in a natural manner (for use). There is no pecking at reduced sized targets like keys on tightly packed miniature keyboards and keypads.

The interface of the invention permits greater operational efficiency than interfaces relying on the thumb as the primary if not sole instrument for interacting with the device.

This is because the invention employs all fingers to operate the device, in particular the four most dextrous fingers of the hand, which conventional interface designs relegate to holding it. Besides, it makes use of all fingers, the thumb in particular, in an appropriate manner, without taxing their motor capabilities.

The interface of the invention is scalable in the sense that users make the same signs irrespective of the size of the device operated. This obviates the need for ad hoc mechanisms to scale or otherwise configure an interface for or to adapt it to the hand of the individual user. As long as a user can hold a device embodying the invention in a handshake like grip, any user can operate it as is. This dispenses with additional components that many conventional tactile interfaces require to bring their controls within the reach of the user's thumb, which add to the size, complexity, and cost of producing and supporting such devices.

The interface of the invention can be used without modification with either hand. There is no need to reconfigure it for the handedness of the user, reducing the complexity and cost of producing the device.

The invention can be deployed as is on devices of a wide variety of shapes, because it is to a high degree independent of the shape of the device. As long as a user can grip a device equipped with the interface of the invention comfortably, his fingers are ipso facto in position to operate it. The interface of the invention is not constrained by a structured layout with marks in fixed locations that the user's fingers must connect with. Where the user's hand touches the device is where it engages the interface. The issue of controls that are out of range or too small to be reliably hit with a stubby and awkward pointer like the thumb or not visible to users with impaired vision does not arise.

The user does not have to see the interface or be looking at it to interact with it. This can be an advantage when operating the device in the dark or when the user's attention is elsewhere, as when using a remote control to operate another device or when driving a car. For the visually impaired it is a decisive advantage over fixed controls that cannot be identified by feel.

Typing with the method of the present invention is straightforward compared with the standard ITU E.161 keypad. Every character takes two keystrokes, slightly less than the average number of keystrokes per character on a keypad. This allows the user to type at a steady rhythm which favors speed. With the keypad the number of keystrokes per character varies (between one and four) and the flow of keystrokes is syncopated. Furthermore, to type the same character twice in a row the user has to interrupt the already syncopated rhythm but only for specific character sequences. For two spaces in a row, to give an example, the user just hits the space key twice without pausing. Not so for two Ts. Typing two Ts in a row without pausing produces a U. This is because U is on the same key as T. U requires two keystrokes and T one. Pressing the key twice without pausing (for the T to register) produces a U. These heteroclitic conditions are an impediment to fluid typing and add complexity to an already complicated system. Since users are able to master the keypad as it is, it is reasonable to assume they will be able to learn the more straightforward system the present invention represents.

When using the interface of the invention, the user has positive control over the process and a full and unobstructed view of the display. The fingers do not interact with it. Point scanning, i.e. bringing two cross hairs to intersect on a point, allows the user to hit pinpoint targets with precision. So does pointing a cursor at them. This is not possible with a conventional interface where the finger pad of the thumb (or any other finger used as a pointer) is disproportionately large compared to the target and where it hides the target, making it impossible to hit it with accuracy, a phenomenon known as the fat finger problem.

The interface of the invention can be configured to respond only to contacts comprising six contact patches in standard configuration. In this way, the device can for all practical purposes be secured against being triggered unintentionally through accidental contact, for example when carrying it around in a purse or a pocket. Handheld devices with touch screen interfaces are particularly susceptible to this and must be made secure for transport.

Embodiments of the invention with a compressible outer layer provide a degree of tactile feedback not present in conventional devices. In addition, a cushioned housing protects a device from damage through being dropped.

Last but not least, while the interface of the present invention reflects a paradigm shift with respect to interface concept, it can be deployed in combination with an interface of conventional design. The possibility of operating a device in hybrid fashion may facilitate the transition from interfaces of conventional design to the interface of the invention.

In one broad embodiment, the present invention is applicable to smartphones, conventional cell phones, pagers, calculators, handheld VR controllers, remote controls (including new kinds the invention makes possible such as remote controls built into steering wheels), CEPS navigation devices, and handheld keypads among other devices.

While the foregoing written description of the invention enables one of ordinary skill to make and use what is considered presently to be the best mode thereof, those of ordinary skill will understand and appreciate the existence of variations, combinations, and equivalents of the specific embodiments, methods, and examples herein. The invention should therefore not be limited by the above described embodiments, methods and examples, but by all embodiments and methods within the scope and spirit of the present invention.

The invention claimed is:

1. A device comprising:

a housing;

a continuous sensor region on the housing;

wherein the continuous sensor region is configured to detect a spatial configuration of contact patches made by contact with a user, each contact patch among the spatial configuration of contact patches having a corresponding area with a corresponding centroid; and one or more processors configured to perform operations comprising:

selecting a set of contact patches from the spatial configuration of contact patches detected by the continuous sensor region, the selecting of the set of contact patches from the spatial configuration being based on the corresponding centroids of the set of contact patches relative to each other;

subdividing the set of contact patches selected from the spatial configuration of contact patches into opposed columns of contact patches, the subdividing of the selected set of contact patches being based on the corresponding centroids of the selected set of contact patches relative to each other;

identifying a sign made by the contact with the user based on the corresponding centroids of the opposed columns of contact patches subdivided from the set of contact patches based on their corresponding centroids relative to each other and selected from the spatial configuration detected by the continuous sensor region based on their corresponding centroids relative to each other; and generating a device control signal that corresponds to the identified sign.

2. The device of claim 1, wherein the identifying of the sign includes recognizing a standard configuration of six contact patches.

3. The device of claim 1, wherein the corresponding area of each contact patch among the spatial configuration of contact patches has a corresponding size, and the identifying of the sign is based on the corresponding sizes of the contact patches in the opposed columns of contact patches.

4. The device of claim 1, wherein each contact patch among the spatial configuration of contact patches has a corresponding detected pressure, and the identifying of the sign is based on the corresponding pressures of the contact patches in the opposed columns of contact patches.

5. The device of claim 1, wherein each contact patch among the spatial configuration of contact patches has a corresponding combination of centroid location, patch size, and contact pressure, and the identifying of the sign is based on the corresponding combinations of centroid location, patch size, and contact pressure for the contact patches in the opposed columns of contact patches.

6. The device of claim 1, wherein the device is a first device communicatively coupled to a second device, and the generated device control signal that corresponds to the identified sign is provided by the first device to control the second device.

7. The device of claim 1, wherein the identifying of the sign is based on movement of at least one of the corresponding centroids of the contact patches in the opposed columns of contact patches.

8. A method comprising:

detecting, by a continuous sensor region on a housing of a device, a spatial configuration of contact patches made by contact with a user, each contact patch among the plurality spatial configuration of contact patches having a corresponding area with a corresponding centroid;

selecting, by one or more processors of the device, a set of contact patches from the spatial configuration of contact patches detected by the continuous sensor region, the selecting of the set of contact patches from the spatial configuration being based on the corresponding centroids of the contact patches in the set of contact patches relative to each other;

subdividing, by the one or more processors of the device, the set of contact patches detected by the continuous sensor region and selected based on their corresponding centroids relative to each other into opposed columns of contact patches, the subdividing of the selected set of contact patches being based on the corresponding centroids of the selected set of contact patches relative to each other;

identifying, by the one or more processors of the device, a sign made by the contact with the user based on the corresponding centroids of the opposed columns of contact patches subdivided from the set of contact patches based on their corresponding centroids relative to each other and selected from the spatial configuration detected by the continuous sensor region based on their corresponding centroids relative to each other; and generating, by the one or more processors of the device, a device control signal that corresponds to the identified sign.

9. The method of claim 8, wherein the identifying of the sign includes recognizing a standard configuration of six contact patches.

10. The method of claim 8, wherein the corresponding area of each contact patch among the spatial configuration of contact patches has a corresponding size, and the identifying of the sign is based on the corresponding sizes of the contact patches in the opposed columns of contact patches.

11. The method of claim 8, wherein each contact patch among the spatial configuration of contact patches has a corresponding detected pressure, and the identifying of the sign is based on the corresponding pressures of the contact patches in the opposed columns of contact patches.

12. The method of claim 8, wherein each contact patch among the spatial configuration of contact patches has a corresponding combination of centroid location, patch size, and contact pressure, and the identifying of the sign is based on the corresponding combinations of centroid location, patch size, and contact pressure for the contact patches in the opposed columns of contact patches.

13. The method of claim 8, wherein the device is a first device communicatively coupled to a second device, and the generated device control signal that corresponds to the identified sign is provided by the first device to control the second device.

14. The method of claim 8, wherein the identifying of the sign is based on movement of at least one of the corresponding centroids of the contact patches in the opposed columns of contact patches.

* * * * *

UNITED STATES PATENT AND TRADEMARK OFFICE

CERTIFICATE OF CORRECTION

PATENT NO. : 11,360,662 B2
APPLICATION NO. : 16/311804
DATED : June 14, 2022
INVENTOR(S) : Michael Helke It is certified that error appears in the above-identified patent and that said Letters Patent is hereby corrected as shown below:

On the Title Page

In Column 2, under Item (56) "Other Publications", Line 1, delete "Applicaton" and insert --Application-- therefor In the Specification In Column 1, Line 8, delete "file" and insert --filed-- therefor In Column 1, Line 9, before "on", insert --filed--

In Column 1, Line 9, delete "2010," and insert --2016,-- therefor

In Column 1, Lines 14-15, delete "human machine" and insert --human-machine-- therefor In Column 2, Line 2, delete "ease" and insert --case-- therefor In Column 2, Line 39, delete "fed" and insert --feel-- therefor In Column 5, Line 21, delete "s" and insert --is-- therefor In Column 5, Line 32, delete "his" and insert --of this-- therefor In Column 10, Line 18, delete "sip," and insert --sign,-- therefor In Column 11, Line 53, delete "SOB" and insert --80B-- therefor In Column 12, Line 11, delete "devices" and insert --degrees-- therefor In Column 12, Line 43, delete "sigh" and insert --sign-- therefor Signed and Sealed this
Thirteenth Day of September, 2022

Katherine Kelly Vidal

Katherine Kelly Vidal
*Director of the United States Patent and Trademark Office*

In Column 13, Line 7, delete “linger” and insert --finger-- therefor

In Column 13, Line 55, delete “tier” and insert --for-- therefor

In Column 14, Line 62, delete “70” and insert --80-- therefor

In Column 15, Line 44, delete “sips” and insert --signs-- therefor

In Column 17, Line 59, delete “sip” and insert --sign-- therefor

In Column 18, Line 66, delete “sips” and insert --signs-- therefor

In Column 20, Line 54, delete “aliped” and insert --aligned-- therefor

In Column 21, Line 45, delete “ease” and insert --case-- therefor

In Column 22, Line 52, delete “UPS” and insert --GPS-- therefor

In Column 22, Line 62, delete “arc” and insert --are-- therefor

In Column 23, Line 2, delete “hack” and insert --back-- therefor

In Column 23, Line 21, delete “arc” and insert --are-- therefor

In Column 24, Line 13, delete “standalone” and insert --stand-alone-- therefor

In Column 26, Line 28, delete “CEPS” and insert --GPS-- therefor

In the Claims

In Column 27, Line 40, in Claim 8, after “the”, delete “plurality”